(12) United States Patent
Tani

(10) Patent No.: US 10,637,556 B2
(45) Date of Patent: Apr. 28, 2020

(54) TRANSMITTING STATION, CONTROL STATION, RECEIVING STATION, DATA TRANSMISSION SYSTEM, AND DATA TRANSMISSION METHOD

(71) Applicant: Mitsubishi Electric Corporation, Tokyo (JP)

(72) Inventor: Shigenori Tani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/082,887

(22) PCT Filed: May 18, 2016

(86) PCT No.: PCT/JP2016/064738
§ 371 (c)(1),
(2) Date: Sep. 6, 2018

(87) PCT Pub. No.: WO2017/199370
PCT Pub. Date: Nov. 23, 2017

(65) Prior Publication Data
US 2019/0115971 A1     Apr. 18, 2019

(51) Int. Cl.
*H04B 7/10* (2017.01)
*H04B 15/00* (2006.01)

(52) U.S. Cl.
CPC .............. *H04B 7/10* (2013.01); *H04B 15/00* (2013.01)

(58) Field of Classification Search
CPC .................................. H04B 7/10; H04B 15/00
(Continued)

(56) References Cited

U.S. PATENT DOCUMENTS 6,061,023 A * 5/2000 Daniel ................. G01S 7/2813
342/354
8,817,672 B2   8/2014 Corman et al.
(Continued)

FOREIGN PATENT DOCUMENTS

JP   2010-171734 A   8/2010
JP   2012-523803 A   10/2012
(Continued)

OTHER PUBLICATIONS

Extended European Search Report issued in corresponding European Application No. 16902389.2 dated Mar. 21, 2019.
(Continued)

*Primary Examiner* — Ayodeji O Ayotunde
(74) *Attorney, Agent, or Firm* — Birch, Stewart, Kolasch & Birch, LLP

(57) ABSTRACT

A transmitting station according to the present invention includes a transmitting antenna capable of changing an orientation direction thereof and a control unit to control the orientation direction of the transmitting antenna in accordance with the orientation direction of the transmitting antenna, the orientation direction of the transmitting antenna and a receiving station for receiving data transmitted from the transmitting antenna being determined on the basis of an estimated value of a received signal quality at a receiving station that is a candidate of the receiving station for receiving the data transmitted from the transmitting antenna and an estimated value of an interference amount caused by reception of the data in another radio communication system.

10 Claims, 13 Drawing Sheets

(58) Field of Classification Search
USPC .................................................... 455/63.4
See application file for complete search history.

(56) References Cited

U.S. PATENT DOCUMENTS

| | | | |
|---|---|---|---|
| 9,094,102 | B2 | 7/2015 | Corman et al. |
| 2011/0206155 | A1* | 8/2011 | Fujimura ............... H04B 7/086 375/267 |
| 2011/0281600 | A1 | 11/2011 | Tanaka |
| 2012/0020319 | A1 | 1/2012 | Song et al. |
| 2017/0272140 | A1* | 9/2017 | Liou .................... H04B 7/0617 |

FOREIGN PATENT DOCUMENTS

| | | |
|---|---|---|
| JP | 2016-25382 A | 2/2016 |
| WO | WO 2010/120790 A2 | 10/2010 |

OTHER PUBLICATIONS

"Digital Video Broadcasting (DVB); Second generation framing structure, channel coding and modulation systems for Broadcasting, Interactive Services, News Gathering and other broadband satellite applications; Part 1: DVB-S2", ETSI EN 302 307-1 V1.4.1 (Nov. 2014), Nov. 2014, (Total No. pp. 80).

"Propagation data and prediction methods required for the design of Earth-space telecommunication systems", ITU-R: Radiocommunication Sector of ITU, P Series: Radiowave propagation, Rec. ITU-R P.618-11, Sep. 2013, (Total No. pp. 28).

Office Action issued in corresponding Canadian Application No. 3,024,082 dated May 27, 2019.

Communication pursuant to Article 94(3) EPC for European Application No. 16902389.2, dated Nov. 14, 2019.

Lee et al., "Effects of Rain Attenuation on Satellite Video Transmission," Vehicular Technology Conference (VTC Spring), 2011 IEEE 73rd, 2011, XP31897131, 5 pages total.

Panagopoulos et al., "Satellite Communications at Ku, Ka, and V Bands: Propagation Impairments and Mitigation Techniques," IEEE Communications Surveys and Tutorials, vol. 6 No. 3, 2004, XP003015856, 13 pages total.

* cited by examiner

TRANSMITTING STATION, CONTROL STATION, RECEIVING STATION, DATA TRANSMISSION SYSTEM, AND DATA TRANSMISSION METHOD

FIELD

The present invention relates to a transmitting station, a control station, a receiving station, and a data transmission method in a data transmission system that transmits data as radio signals.

BACKGROUND

Data transmission systems in which data obtained using artificial satellites such as observation satellites operating in the earth orbit in the outer space is transmitted from the artificial satellites or the like to receiving stations on the Earth have been introduced. In recent years, with an increase in the precision of observation equipment mounted in the observation satellites, the amount of data transmitted by the observation satellites has been increasing. Thus, in order to transmit the data at higher speeds than ever before, the data transmission systems using a band of 26 GHz or the like in which a wide band is available are being studied. Hereinafter, artificial satellite is abbreviated as satellite.

In the data transmission systems using the satellites, signal attenuation such as rain attenuation due to rain, snow, or the like occurs when the receiving stations receive the signals transmitted from the satellites. In particular, as the frequency band becomes higher, the amount of attenuation of signals due to rain increases. Thus, various methods are being studied as measures against the rain attenuation. The measures against the rain attenuation include, for example, the site diversity using a plurality of the receiving stations and the adaptive modulation.

The site diversity using a plurality of the receiving stations is, as described in Non Patent Literature 1, for example, a method in which a plurality of the receiving stations disposed on the Earth receives the data transmitted by the transmitting station mounted in the satellite, and the central station receives the data from the plurality of the receiving stations and synthesizes the received data. The probability that a plurality of receiving stations geographically separated is all in rain at the same time is lower than the probability that a single receiving station is in rain. Thus, using the above-described site diversity, the probability that the signal attenuation occurs due to rain can be reduced, as compared to the case where the single receiving station is used. Consequently, using the above-described site diversity, the probability that the central station can receive the data correctly, that is, the probability that received data agrees with the data transmitted from the transmitting station becomes higher than the probability that the single receiving station, the receiving station can receive data correctly by using a single receiving station. When the above-described site diversity is used, the capability of the correct reception means that the data synthesized by the central station is correct data.

Adaptive modulation is the scheme to change a modulation scheme, a code rate, and the like of transmission signals in accordance with received signal quality. The adaptive modulation is a method referred to as adaptive coding and modulation (ACM) or variable coding and modulation (VCM) in Non Patent Literature 2, for example. This method performs the control to reduce a modulation level and a code rate when reception quality is low, and increase the modulation level and the code rate when the reception quality is high. This control enables transmission and reception satisfying a desired error rate.

As described above, the use of the site diversity can reduce the probability that the signal attenuation occurs due to rain or the like, as compared to the case where the single receiving station is used. This reduces the amount of rain attenuation that should be estimated in the channel design, and thus increases a design value in the received signal quality. Consequently, the modulation level and the code rate can be set higher to improve throughput.

CITATION LIST

Non Patent Literature

Non Patent Literature 1: International Telecommunication Union (ITU-R) P. 618-11, September 2013 Non Patent Literature 2: European Telecommunications Standards Institute Technical Specification (ETSI TS) 302 307-1 V1.4.1, November 2014

SUMMARY

Technical Problem

An orbiting satellite such as a satellite in a synchronous sub-recurrent orbit varies in the ground path of the satellite orbit. Thus, an elevation angle of the satellite at the receiving station and the distance between the receiving station and the satellite vary depending on the location in the orbit of the satellite, so that the shape and area of the beam emitted by the satellite vary. That is, even when the orientation direction of the beam is determined such that the received signal quality at a plurality of the receiving stations performing the site diversity has a desired value, the received signal quality at the receiving stations can disadvantageously fall below the desired value depending on changes in the location of the satellite.

Furthermore, in a case where a frequency used for communication between the orbiting satellite and the receiving station is the same as a frequency used by another radio communication system on the ground, radio waves may interfere with each other, thereby deteriorating a communication quality. In particular, since the interference amount increases in a case where a receiving station of the other radio communication system is positioned within a beam irradiation range of the orbiting satellite, a method for avoiding the interference is required.

The present invention has been made in consideration of the above. An object of the present invention is to obtain a transmitting station capable of suppressing an interference applied to the other radio communication system and maintaining a received signal quality at a receiving station for receiving data of an orbiting satellite, the received signal quality being equal to or more than a desired value.

Solution to Problem

To solve the above problem and achieve the object, the present invention provides a transmitting station comprising: a transmitting antenna capable of changing an orientation direction thereof; and a control unit to control the orientation direction of the transmitting antenna in accordance with the orientation direction of the transmitting antenna, the orientation direction of the transmitting antenna and a receiving station for receiving data transmitted from the transmitting antenna being determined on the basis of an estimated value of a received signal quality at a receiving station that is a candidate for receiving the data transmitted from the transmitting antenna and an estimated value of an interference amount caused by reception of the data in another radio communication system.

Advantageous Effects of Invention

A transmitting station according to the present invention provides an effect of suppressing an interference applied to the other radio communication system and maintaining a received signal quality at a receiving station for receiving data of an orbiting satellite, the received signal quality being equal to or more than a desired value.

DESCRIPTION OF EMBODIMENTS

Hereinafter, a transmitting station, a control station, a receiving station, a data transmission system, and a data transmission method according to embodiments of the present invention will be described in detail with reference to the drawings. The embodiments are not intended to limit the invention.

Embodiment

Figure 1:
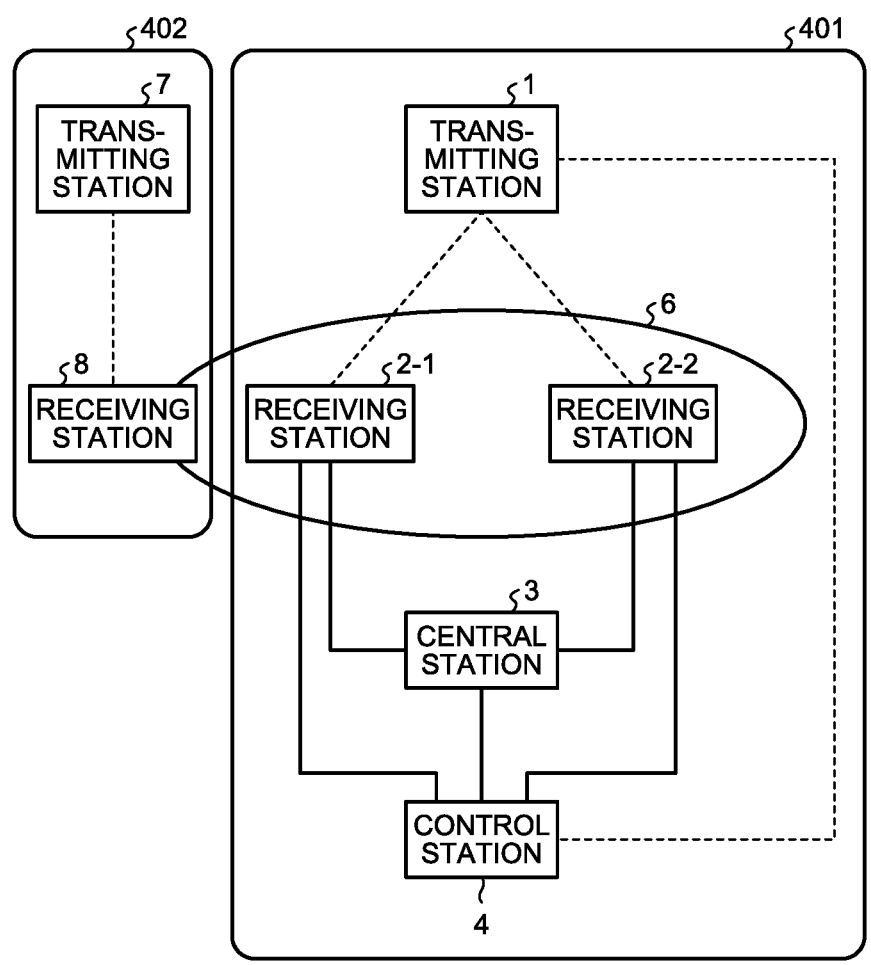
FIG. 1 is a diagram illustrating a configuration example of a data transmission system in an embodiment.

FIG. 1 is a diagram illustrating a configuration example of a data transmission system according to an embodiment. A first radio communication system 401 that is the data transmission system in the present embodiment includes a transmitting station 1, receiving stations 2-1 and 2-2, a central station 3, and a control station 4. A second radio communication system 402 is an example of the other radio communication system using the same frequency or the same polarization as the first radio communication system 401. The phrase "using the same frequency or the same polarization" means that at least one of the frequency and the polarization is the same. The second radio communication system 402 includes a transmitting station 7 and a receiving station 8. Although FIG. 1 illustrates only two receiving stations, the number of receiving stations is not limited to this. Hereinafter, when the receiving stations 2-1 and 2-2 are discussed without being distinguished from each other, they are each referred to as a receiving station 2. The second radio communication system 402 is a desired radio communication system, and a single transmitting station 7 and a single receiving station 8 are illustrated in FIG. 1. However, the numbers of transmitting stations 7 and receiving stations 8 may be equal to or more than two. Note that the second radio communication system 402 may be any general radio communication system, and in the present embodiment, detailed description of the transmitting station 7 and the receiving station 8 of the second radio communication system 402 will be omitted.

The transmitting station 1 is a transmitting apparatus mounted in a satellite. Although an example where the transmitting station 1 is mounted in the satellite is herein described, the transmitting station 1 may alternatively be mounted in an aircraft or the like. The receiving stations 2-1 and 2-2 are installed on the Earth. The central station 3 and the control station 4 are also installed on the Earth. In FIG. 1, dotted lines and solid lines connecting the stations show connection forms between the stations. The dotted lines represent wireless connections, and the solid lines represent wired connections. The transmitting station 1 and the receiving stations 2-1 and 2-2 are wirelessly connected, and the receiving stations 2-1 and 2-2 and the central station 3 are connected by wires. The control station 4 is connected to the receiving stations 2-1 and 2-2 and the central station 3 by wires, and is wirelessly connected to the transmitting station 1. A radio channel between the control station 4 and the transmitting station 1 and a radio channel between the transmitting station 1 and the receiving stations 2-1 and 2-2 are different from each other. The radio channel between the control station 4 and the transmitting station 1 is referred to as a control channel where appropriate, and the radio channel between the transmitting station 1 and the receiving stations 2-1 and 2-2 is referred to as a data channel where appropriate. The control channel and the data channel are different in frequency, for example.

A footprint 6 shows an area on the ground surface where radio waves emitted by the transmitting station 1 through the data channel can be received. A range of irradiation by the transmitting station 1 through the data channel is called a beam. It is assumed that a communication method using the control channel between the control station 4 and the transmitting station 1 is different from a communication method using the data channel between the transmitting station 1 and the receiving stations 2-1 and 2-2. Thus, an area in which radio waves transmitted by the transmitting station 1 using the control channel can be received may be different from an area in which radio waves emitted by the transmitting station 1 using the data channel can be received.

Figure 2:
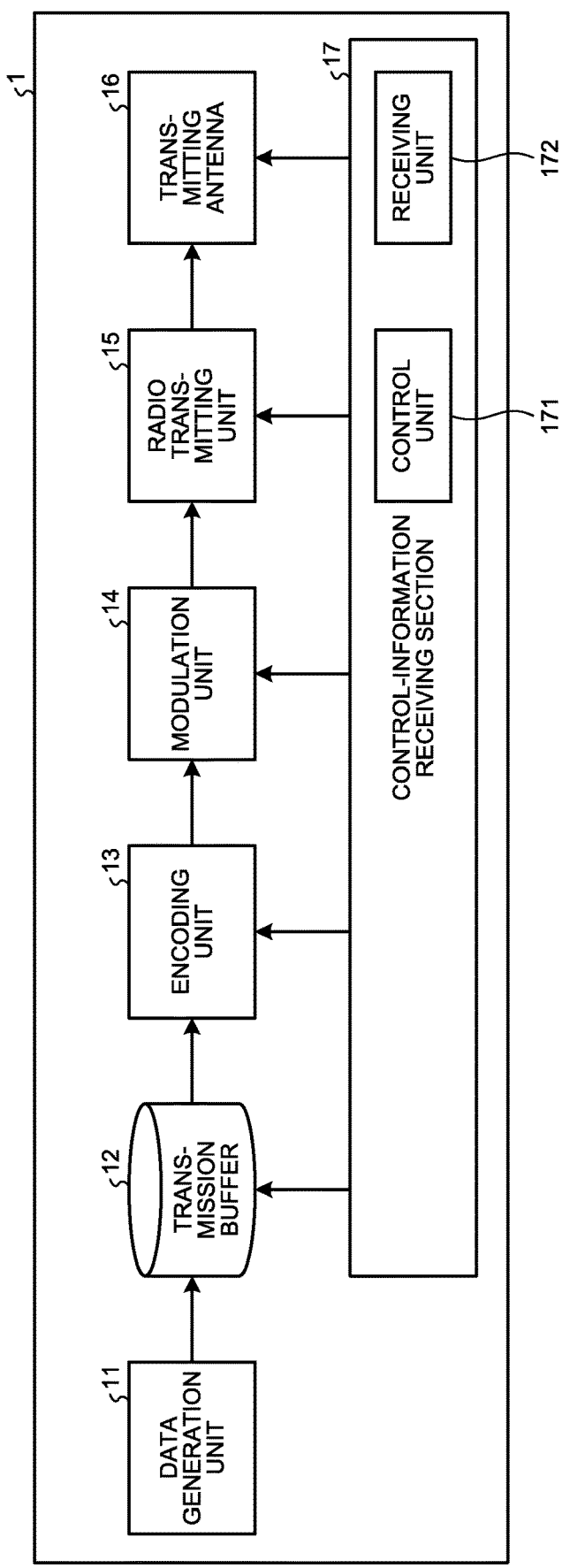
FIG. 2 is a diagram illustrating a configuration example of a transmitting station in the embodiment.

FIG. 2 is a diagram illustrating a configuration example of the transmitting station 1 in the present embodiment. The transmitting station 1 in the present embodiment includes a data generation unit 11, a transmission buffer 12, an encoding unit 13, a modulation unit 14, a radio transmitting unit 15, a transmitting antenna 16, and a control-information receiving section 17. The data generation unit 11 generates data to be transmitted such as observation information, that is, transmission data. The data generation unit 11 may be, for example, observation equipment or the like, or may be a processing circuit that performs processing such as compression on observation data from observation equipment to generate data to be transmitted. The transmission buffer 12 stores data generated by the data generation unit 11.

The encoding unit 13 encodes data output from the transmission buffer 12, that is, the transmission data. For a code used in encoding at the encoding unit 13, a convolution code, a low-density parity-check (LDPC) code, a Reed-Solomon (RS) code, or the like can be used, but it is not limited to them. The modulation unit 14 modulates the encoded data. As a modulation scheme at the modulation unit 14, for example, quadrature phase-shift keying (QPSK), quadrature amplitude modulation (QAM), or the like can be used, but it is not limited to them. The modulation radio transmitting unit 15 converts the modulated data into a signal of a radio transmission frequency band, amplifies this signal and transmits the amplified signal as a radio signal through the transmitting antenna 16. The transmitting antenna 16 is an antenna whose orientation direction is changeable. The control-information receiving section 17 receives control information from the control station 4, and controls the operations of parts constituting the transmitting station 1 on the basis of the received control information. A receiving unit 172 of the control-information receiving section 17 receives the control information from the control station 4 and inputs this control information to a control unit 171. The control unit 171 of the control-information receiving section 17 controls the operations of the parts constituting the transmitting station 1 on the basis of the input control information.

The control information contains information specifying an orientation direction of the transmitting antenna 16. Specifically, the receiving unit 172 receives from the control station 4 an orientation direction of the transmitting antenna 16 determined at the control station 4 together with receiving stations to receive data transmitted from the transmitting antenna 16, on the basis of estimate values of received signal quality at receiving stations 2 that are candidates for receiving stations to receive the data. The control unit 171 controls the orientation direction of the transmitting antenna 16, in accordance with the orientation direction received by the receiving unit 172. Control performed by the control-information receiving section 17 will be described later. The control information may also include information indicating an encoding scheme and a control scheme. In this case, the receiving unit 172 receives from the control station 4 the information indicating an encoding scheme and a modulation scheme determined at the control station 4 on the basis of the estimate values of received signal quality at the receiving stations 2 corresponding to the orientation direction of the transmitting antenna 16. On the basis of the received information indicating the encoding scheme and the modulation scheme, the control unit 171 indicates the encoding scheme to the encoding unit 13, and indicates the modulation scheme to the modulation unit 14.

The parts illustrated in FIG. 2 can each be implemented as hardware such as an individual device or circuit. The data generation unit 11 is observation equipment or a processing circuit for generating data, or the like. The transmission buffer 12 is a memory. The encoding unit 13 is an encoder. The modulation unit 14 is a modulator or a modem. The radio transmitting unit 15 is a processing circuit including an analog-to-digital converter circuit, a frequency converter circuit, an amplifier circuit, and others. The receiving unit 172 of the control-information receiving section 17 is a receiver. The control unit 171 of the control-information receiving section 17 is a processing circuit that controls the parts on the basis of the control information. The above parts may be configured as individual circuits or devices, or a plurality of functional parts may be configured as a single circuit or device.

The data generation unit 11 (when the unit 11 is the processing circuit for generating data), the control unit 171 in the control-information receiving section 17, the encoding unit 13, and the modulation unit 14 may be dedicated hardware, or may be a control circuit including a memory and a CPU (also called a central processing unit, a central processor, a processing unit, an arithmetic unit, a microprocessor, a microcomputer, a processor, or a digital signal processor (DSP)) that executes programs stored in the memory. Here, the memory corresponds to nonvolatile or volatile semiconductor memory such as random-access memory (RAM), read-only memory (ROM), flash memory, an erasable programmable read-only memory (EPROM), or an electrically erasable programmable read-only memory (EEPROM), or a magnetic disk, a flexible disk, an optical disk, a compact disk, a mini disk, a digital versatile disk (DVD), or the like.

When the data generation unit 11 (when the unit 11 is the processing circuit for generating data), the processing circuit in the control-information receiving section 17, the encoding unit 13, and the modulation unit 14 described above are implemented by dedicated hardware, these are, for example, a single circuit, a combined circuit, a programmed processor, a parallel-programmed processor, an application-specific integrated circuit (ASIC), a field-programmable gate array (FPGA), or a combination thereof.

Figure 3:
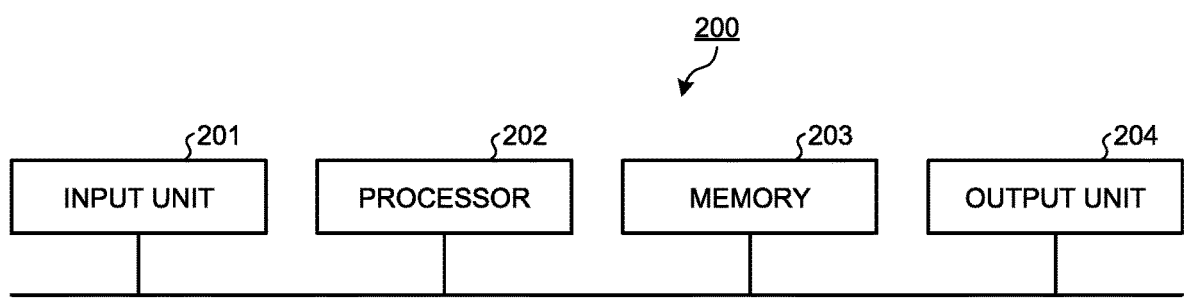
FIG. 3 is a diagram illustrating a configuration example of a control circuit in the embodiment.

When the data generation unit 11 (when the unit 11 is the processing circuit for generating data), the processing circuit in the control-information receiving section 17, the encoding unit 13, and the modulation unit 14 are implemented by a control circuit including a CPU, the control circuit is, for example, a control circuit 200 of a configuration illustrated in FIG. 3. As illustrated in FIG. 3, the control circuit 200 includes an input unit 201 that is a receiving unit that receives data input from the outside, a processor 202 that is a CPU, a memory 203, and an output unit 204 that is a transmitting unit that transmits data to the outside. The input unit 201 is an interface circuit that receives data input from the outside of the control circuit 200 and supplies this input data to the processor 202. The output unit 204 is an interface circuit that sends data from the processor 202 or the memory 203 to the outside of the control circuit 200. When the data generation unit 11 (when the unit 11 is the processing circuit for generating data), the processing circuit in the control-information receiving section 17, the encoding unit 13, and the modulation unit 14 are implemented by the control circuit 200 illustrated in FIG. 3, they are implemented by the processor 202 reading and executing a program stored in the memory 203 and corresponding to individual processing of each part. The memory 203 is also used as temporary memory in individual processing executed by the processor 202.

Next, an operation at the transmitting station 1 in the present embodiment will be described. The data generation unit 11 of the transmitting station 1 generates data and stores the generated data in the transmission buffer 12. The transmission buffer 12 outputs data to the encoding unit 13 in an amount of transfer specified by the control-information receiving section 17 at a time specified by the control-information receiving section 17. The specified time is, for example, a time when an elevation angle between the transmitting station 1 and the receiving station 2 to which data is transmitted becomes a predetermined angle or more. The specified time may be notified by the control station 4, or may be calculated by the control unit 171 on the basis of a location of the receiving station 2 and a location of the control unit 171 itself, that is, a location of a satellite in which the transmitting station 1 is mounted. In the latter case, the location of the receiving station 2 to which data is transmitted is notified by the control station 4. For the location of the receiving station 2, the location of the receiving station 2 and identification information on the receiving stations 2 may be stored in association with each other in advance in an internal or external memory of the control unit 171 and the identification information on the receiving stations 2 may be notified by the control station 4. For the location of the satellite, the satellite generally has a function of calculating its own location, and can use the location calculated by the function. The specified amount of transfer is calculated by the control unit 171 on the basis of an encoding scheme and a modulation scheme notified by the control station 4.

The encoding unit 13 encodes data output from the transmission buffer 12 by the encoding scheme specified by the control unit 171 of the control-information receiving section 17. The encoding scheme includes an encoding type, a code rate, and a puncture pattern, that is, a rule of bits to be removed from a data string. The encoding type indicates a type of a used code such as a convolution code or an LDPC code. The encoding scheme may be notified by the control station 4, or the encoding scheme may be changed in a predetermined change pattern. For example, a plurality of encoding schemes is previously stored in the internal or external memory of the control unit 171, and the control unit 171 selects one of the plurality of encoding schemes in accordance with a predetermined condition. For example, the control unit 171 may select an encoding scheme on the basis of its own location and the location of the receiving station 2. Specifically, for example, the control unit 171 selects the encoding scheme in accordance with an elevation angle between the receiving station 2 and the transmitting station 1. For example, when the elevation angle is smaller than or equal to a first value, a first encoding scheme is used. When the elevation angle is larger than the first value and smaller than or equal to a second value, a second encoding scheme is used. When the elevation angle is larger than the second value, a third encoding scheme is used. The second value is larger than the first value. The elevation angle can be calculated on the basis of its own location described above and the location of the receiving station 2.

The encoding unit 13 may include, into data, information on data transmission specified by the control unit 171 of the control-information receiving section 17, that is, transmission control information indicating the encoding scheme, the modulation scheme, and others. This allows the receiving station 2 to correctly demodulate and decode the data received from the transmitting station 1 because the receiving station 2 receives the transmission control information prior to demodulation of the data even when the encoding scheme and the modulation scheme are changed from hour to hour.

The modulation unit 14 modulates the encoded data output from the encoder 13 by a modulation scheme specified by the control unit 171 of the control-information receiving section 17. Like the encoding scheme of the encoding unit 13 described above, the control station 4 may notify the modification scheme, or the controller 171 may change the modulation scheme in a predetermined change pattern.

Specifically, for example, the transmitting station 1 holds as a change pattern the correspondence between indices representing an encoding scheme and a modulation scheme according to reception-quality estimate values at each elevation angle of the transmitting station 1 at the receiving stations 2, and sets an encoding scheme and a modulation scheme on the basis of the elevation angle of the transmitting station 1 at the receiving stations 2 and the change pattern.

The radio transmitting unit 15 frequency-converts the data modulated by the modulator 14 to a frequency specified by the control unit 171 of the control-information receiving section 17, amplifies the frequency-converted data, and then transmits this amplified frequency-converted data as a radio signal through the transmitting antenna 16. Like the encoding scheme, the control station 4 may notify the frequency, or the control unit 171 may change the frequency in a predetermined change pattern.

The transmitting antenna 16 emits the signal input from the radio transmitting unit 15 as a radio signal in polarization in an irradiation direction, that is, an orientation direction, the polarization and the direction being specified by the control unit 171 of the control-information receiving section 17. Here, the irradiation direction of the transmitting antenna 16, that is, the beam central direction may be changed by mechanically changing the antenna direction. In a configuration in which a phased array antenna is used as the transmitting antenna 16 to form a desired beam by a plurality of radiation elements, a change in the beam central direction may be implemented by changing the phase and amplitude of each element.

Figure 4:
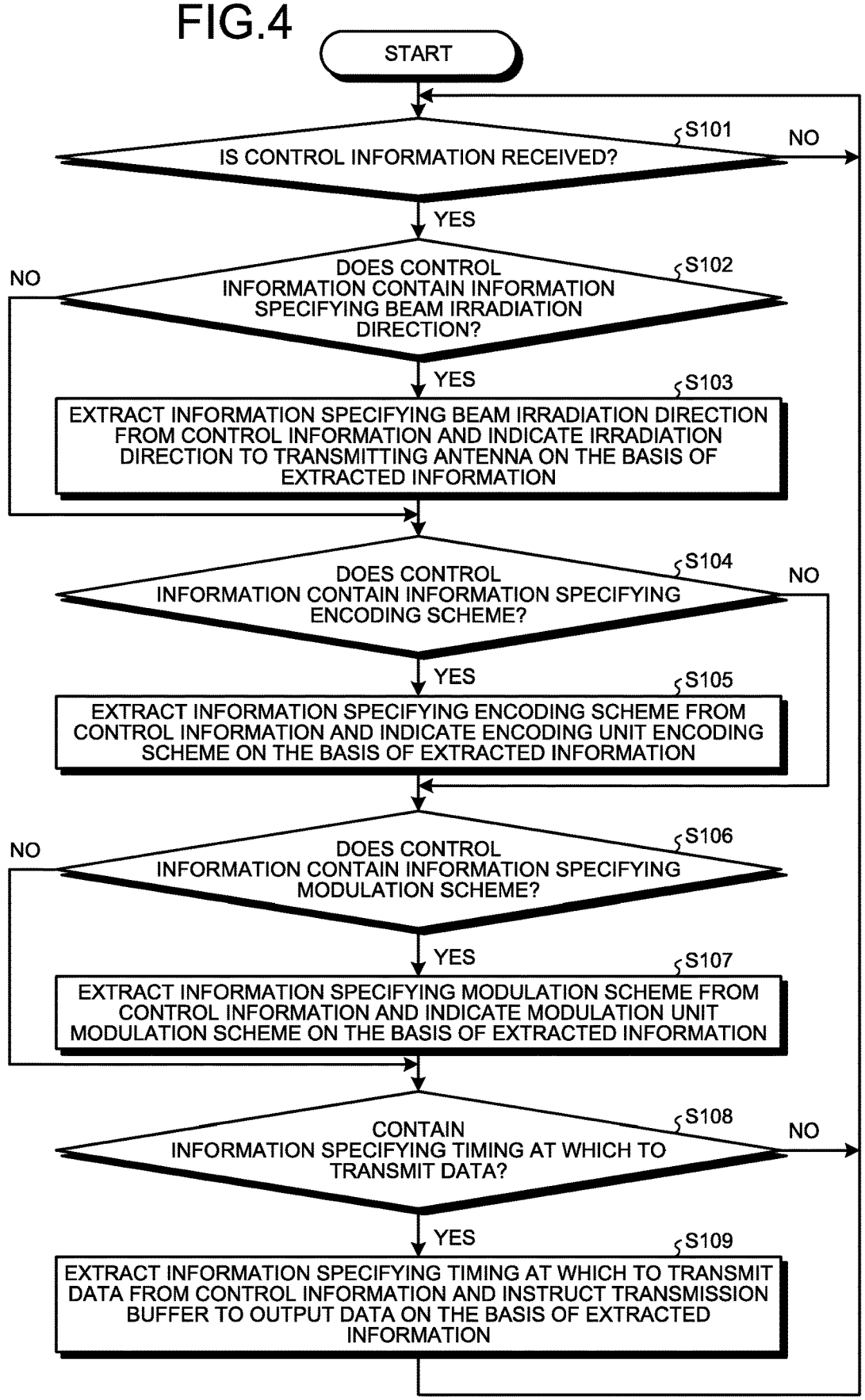
FIG. 4 is a flowchart illustrating an example of a control processing procedure of a control unit of the transmitting station in the embodiment.

Next, an operation of the control unit 171 of the control-information receiving section 17 will be described. FIG. 4 is a flowchart illustrating an example of a control processing procedure of the control unit 171. FIG. 4 illustrates an example where the control station 4 notifies the beam irradiation direction, the encoding scheme, the modulation scheme, and a timing at which data is transmitted. The control unit 171 determines whether the control unit 171 has received control information, that is, whether the control information has been input from the receiving unit 172 (step S101). When the control unit 171 does not receive the control information (No in step S101), the control unit 171 repeats step S101. When the control unit 171 has received the control information (Yes in step S101), the control unit 171 determines whether the control information contains information specifying the beam irradiation direction or not (step S102). It is assumed that the control information transmitted from the control station 4 contains identification information indicating, for example, what type of information is contained, and the control unit 171 can identify what type of information is contained on the basis of the identification information. When the control information contains the information specifying the beam irradiation direction (Yes in step S102), the control unit 171 extracts from the control information the information specifying the beam irradiation direction, and indicates the irradiation direction to a transmitting antenna 16 on the basis of the extracted information (step S103). Note that the information for specifying the irradiation direction may contain information specifying the polarization: the information contains, in a case of, e.g., circular polarization, information on the situations where right-handed polarization is used, where left-handed polarization is used, and where both of these polarizations are used.

The control unit 171 determines whether the control information contains information specifying an encoding scheme or not (step S104). When the control information contains the information specifying the encoding scheme (Yes in step S104), the control unit 171 extracts the information specifying the encoding scheme from the control information, and indicates to the encoding unit 13 the encoding scheme on the basis of the extracted information (step S105).

The control unit 171 also determines whether the control information contains information specifying a modulation scheme or not (step S106). When the control information contains the information specifying the modulation scheme (Yes in step S106), the control unit 171 extracts the information specifying the modulation scheme from the control information, and indicates to the modulation unit 14 the modulation scheme on the basis of the extracted information (step S107).

The control unit 171 also determines whether the control information contains information specifying a timing at which to transmit data or not (step S108). When the control information contains the information specifying the timing at which to transmit the data (Yes in step S108), the control unit 171 extracts the information specifying the timing at which to transmit the data from the control information, instructs the transmission buffer 12 to output data on the basis of the extracted information (step S109), and returns to step S101.

When the control information does not contain the information specifying the beam irradiation direction in step S102 (No in step S102), the control unit 171 proceeds to step S104. When the control information does not contain the information specifying the encoding scheme in step S104 (No in step S104), the control unit 171 proceeds to step S106. When the control information does not contain the information specifying the modulation scheme in step S106 (No in step S106), the control unit 171 proceeds to step S108. When the control information does not contain the information specifying the timing at which to transmit the data in step S108 (No in step S108), the control unit 171 returns to step S101.

The above procedure is an example. Step S102 and step S103, step S104 and step S105, step S106 and step S107, and step S108 and step S109 may be changed in order. Alternatively, step S102 and step S103, step S104 and step S105, step S106 and step S107, and step S108 and step S109 may be executed in parallel.

Of the processing executed by the control-information receiving section 17, the control on the functional parts related to the data transmission method in the present embodiment has been described hereinabove. The control-information receiving section 17 may further execute processing other than the above-described processing. FIG. 4 illustrates an example where the control station 4 notifies the beam irradiation direction, the encoding scheme, the modulation scheme, and the timing at which to transmit the data. As described above, the control unit 171 may determine one or more of the encoding scheme, the modulation scheme, and the timing at which to transmit the data. When the control unit 171 determines one or more items of the beam irradiation direction, the encoding scheme, the modulation scheme, and the timing at which to transmit the data, the control unit 171 performs processing to determine each of the items by the above-described method in place of the processing corresponding to these items in the flowchart in FIG. 4. When the control station 4 notifies the frequency for frequency conversion at the radio transmitter 15, the control unit 171 extracts information specifying a frequency from the received control information, like the encoding scheme, modulation scheme, and timing at which to transmit the data in FIG. 4, and indicates to the radio transmitting unit 15 the frequency on the basis of the extracted information.

Figure 5:
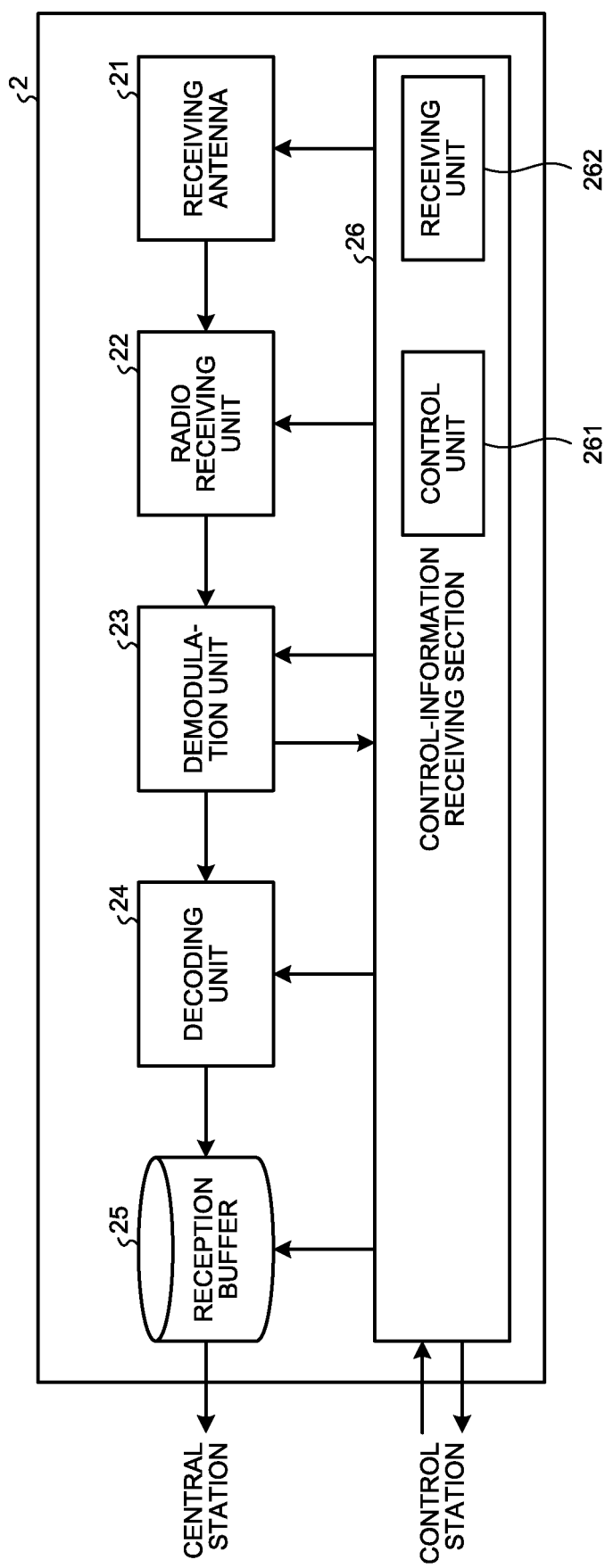
FIG. 5 is a diagram illustrating a configuration example of a receiving station in the embodiment.

FIG. 5 is a diagram illustrating a configuration example of the receiving station 2 in the present embodiment. The receiving station 2 in the present embodiment includes a receiving antenna 21, a radio receiving unit 22, a demodulation unit 23, a decoding unit 24, a reception buffer 25, and a control-information receiving section 26. The receiving antenna 21 receives radio signals transmitted from the transmitting station 1. The radio signal receiving unit 22 converts a received radio signal into an electric signal and outputs this electric signal. The demodulation unit 23 demodulates the electric signal output from the radio receiving unit 22. The decoding unit 24 decodes the signal demodulated by the demodulation unit 23 and stores the decoded data in the reception buffer 25. The control-information receiving section 26 receives the control information from the control unit 4, and controls the operations of parts constituting the receiving station 2. A receiving unit 262 of the control-information receiving section 26 receives the control information from the control station 4 and inputs the received control information to a control unit 261. The control unit 261 controls the operations of the respective parts of the receiving station 2 on the basis of the control information input from the receiving unit 261.

The parts illustrated in FIG. 5 can each be implemented as hardware such as an individual device or circuit. The radio receiving unit 22 is a receiver including an analog-to-digital converter circuit and others, the demodulation unit 23 is a demodulator or a modem, the decoding unit 24 is a decoder, the reception buffer 25 is a memory, the receiving unit 262 of the control-information receiving section 26 is a receiver, and the control unit 261 of the control-information receiving section 26 is a processing circuit for controlling the respective parts. The above respective parts may be configured as individual circuits or devices, or a plurality of functional parts may be configured as a single circuit or device.

The demodulation unit 23, the decoding unit 24, and the control unit 261 may be dedicated hardware, or may be a control circuit including a memory and a CPU that executes programs stored in the memory. When the demodulation unit 23, the decoding unit 24, and the control unit 261 are implemented as dedicated hardware, these are, for example, a single circuit, a combined circuit, a programmed processor, a parallel-programmed processor, an ASIC, an FPGA, or a combination thereof.

When the demodulation unit 23, the decoding unit 24, and the control unit 261 are implemented by a control circuit including a CPU, the control circuit is, for example, the control circuit 200 of the configuration illustrated in FIG. 3.

When the demodulation unit 23, the decoding unit 24, and the control unit 261 are implemented by the control circuit 200 illustrated in FIG. 3, they are implemented by the processor 202 reading and executing the program stored in memory 203 and corresponding to individual processing of each part.

Next, the operation of the receiving station 2 will be described. The receiving antenna 21 of the receiving station 2 receives radio signals emitted by the transmitting antenna 16 of the transmitting station 1. The receiving antenna 21 can change its orientation direction and the polarization, and is oriented in a direction specified by the control-information receiving section 26. An orientation direction of the receiving antenna 21 is notified by the control station 4. However, when the receiving station 2 is specified by the control station 4 as being a non-reception target, the control-information receiving section 26 may instruct the receiving antenna 21 to stop receiving signals from the transmitting station 1.

The radio receiving unit 22 converts a signal received by the receiving antenna 21 to a signal of a frequency specified by the control-information receiving section 26, and subsequently converts the signal of this frequency into an electric signal and outputs this electrical signal. The demodulation unit 23 demodulates the electric signal output from the radio receiving unit 22 by a demodulation scheme specified by the control-information receiving section 26. The selection of the demodulation scheme is notified by the control station 4 such that the selected demodulation scheme corresponds to the modulation scheme used by the modulation unit 14 of the transmitting station 1, or the demodulation scheme is changed in a predetermined change pattern. When the demodulation scheme is changed in the predetermined change pattern, the change pattern should correspond to the predetermined change pattern set at the transmitting station 1. That is, the change pattern is set such that the moment when the transmitting station 1 changes the modulation scheme is the same as the moment when the receiving station 2 changes the demodulation scheme.

When data transmitted by the transmitting station 1 contains transmission control information indicating the modulation scheme, the encoding scheme, and others, the demodulation unit 23 may extract the transmission control information from the electric signal to perform the demodulation by the demodulation scheme corresponding to the modulation scheme contained in the transmission control information. The demodulation unit 23 may calculate the reception quality of a received signal that is an electric signal, as well as performing the demodulation. Specifically, for example, the demodulation unit 23 calculates a signal-to-interference and noise power ratio (SINR), using known data contained in a received signal. When the control station 4 is notified of the reception quality measured by the demodulation unit 23, the control station 4 can select the modulation scheme and the encoding scheme according to the most recent reception quality. The selection of the modulation scheme and the encoding scheme is described hereinafter.

The decoding unit 24 decodes the data demodulated by the demodulation unit 23, by the decoding scheme specified by the control-information receiving section 26, and stores the decoded data in the reception buffer 25. Like the demodulation scheme at the demodulation unit 23, the selection of the decoding scheme is specified by the control station 4, or the decoding scheme is changed in a predetermined change pattern, or the selection of the decoding scheme follows information contained in the transmission control information. The decoding scheme should be the decoding scheme corresponding to the encoding scheme at the transmitting station 1. Decoded data output by the decoding unit 24 may be a hard-decision value or a soft-decision value. The decoding unit 24 stores, in the reception buffer 25, a reception result indicating that the decoding is succeeded or failed together with the decoded data. The success or failure in the decoding can be determined, for example, by decoding a CRC (cyclic redundancy check) code as the encoding unit 13 of the transmitting station 1 performs the encoding that is not only error-correction coding with an LDPC or the like but also error-detection coding with the CRC or the like.

The reception buffer 25 holds the decoded data and the reception result received from the decoder 24, and outputs the held decoded data and reception result to the central station 3 at a desired timing. The central station 3 and the receiving stations 2-1 and 2-2 are connected by dedicated lines or the like, and the data can be output from the reception buffer 25 to the central station 3.

Figure 6:
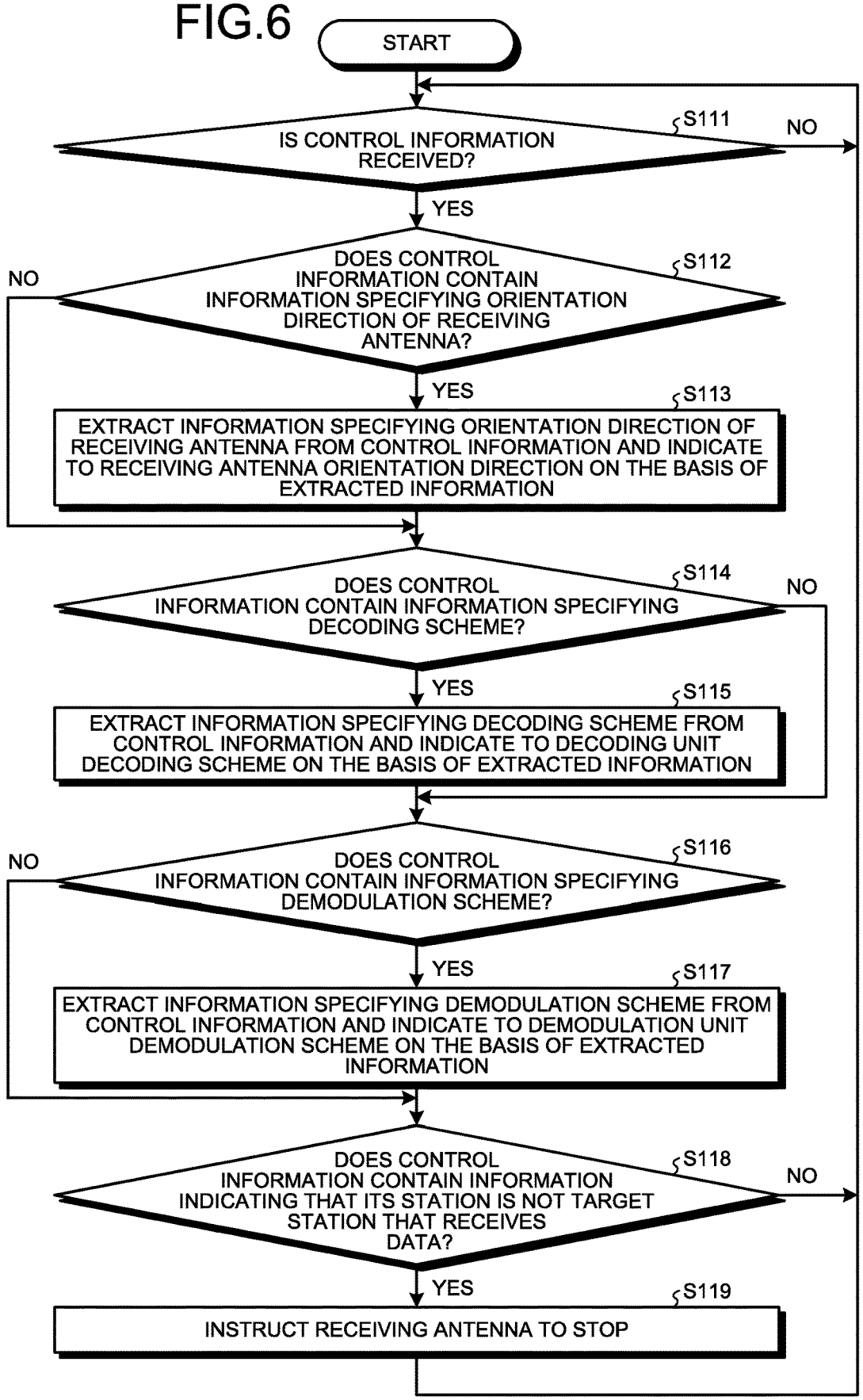
FIG. 6 is a flowchart illustrating an example of a control processing procedure of a control unit of the receiving station in the embodiment.

Next, the operation of the control unit 261 of the control-information receiving section 26 will be described. FIG. 6 is a flowchart illustrating an example of a control processing procedure of the control unit 261. FIG. 6 illustrates an example where the control station 4 notifies an orientation direction of the receiving antenna, a decoding scheme, a demodulation scheme, and information indicating to the receiving station 2 whether the receiving station 2 is a reception target station or not. The control unit 261 determines whether the control unit 261 has received the control information, that is, whether the control information has been input from the receiving unit 262 or not (step S111). When the control unit 261 does not receive the control information (No in step S111), the control unit 261 repeats step S111. When the control unit 261 has received the control information (Yes in step S111), the control unit 261 determines whether the control information contains information specifying an orientation direction of the receiving antenna or not (step S112). When the control information contains the information specifying the orientation direction of the receiving antenna (Yes in step S112), the control unit 261 extracts the information specifying the orientation direction of the receiving antenna from the control information, and indicates to the receiving antenna 21 the orientation direction on the basis of the extracted information (step S113).

The control unit 261 determines whether the control information contains information specifying a decoding scheme or not (step S114). When the control information contains the information specifying the decoding scheme (Yes in step S114), the control unit 261 extracts the information specifying the decoding scheme from the control information, and indicates to the decoding unit 24 the decoding scheme on the basis of the extracted information (step S115).

The control unit 261 also determines whether the control information contains information specifying a demodulation scheme or not (step S116). When the control information contains the information specifying the demodulation scheme (Yes in step S116), the control unit 261 extracts the information specifying the demodulation scheme from the control information, and indicates to the demodulation unit 23 the demodulation scheme on the basis of the extracted information (step S117).

The control unit 261 also determines whether or not the control information contains information indicating that its station is not a target station that receives data (step S118).

When the control information contains the information indicating that its station is not the target station that receives the data (Yes in step S118), the control unit 261 instructs the receiving antenna 21 to stop reception (step S119), and returns to step S111.

When the control information does not contain the information specifying the orientation direction of the receiving antenna in step S112 (No in step S112), the control unit 261 proceeds to step S114. When the control information does not contain the information specifying the decoding scheme in step S114 (No in step S114), the control unit 261 proceeds to step S116. When the control information does not contain the information specifying the demodulation scheme in step S116 (No in step S116), the control unit 261 proceeds to step S118. When the control information does not contain the information indicating that its station is not the target station that receives the data in step S118 (No in step S118), the control unit 261 returns to step S111.

The above procedure is an example. Like the processing procedure illustrated in FIG. 4, the order of the steps may be changed, or a control unit 261 may determine one or more of the demodulation scheme, the decoding scheme, and others. Furthermore, information specifying an orientation direction may contain the information specifying the polarization: the information contains, in a case of, e.g., circular polarization, information indicating any one of the situations where: the right-handed polarization is used; the left-handed polarization is used; and the both of these polarizations are used.

Figure 7:
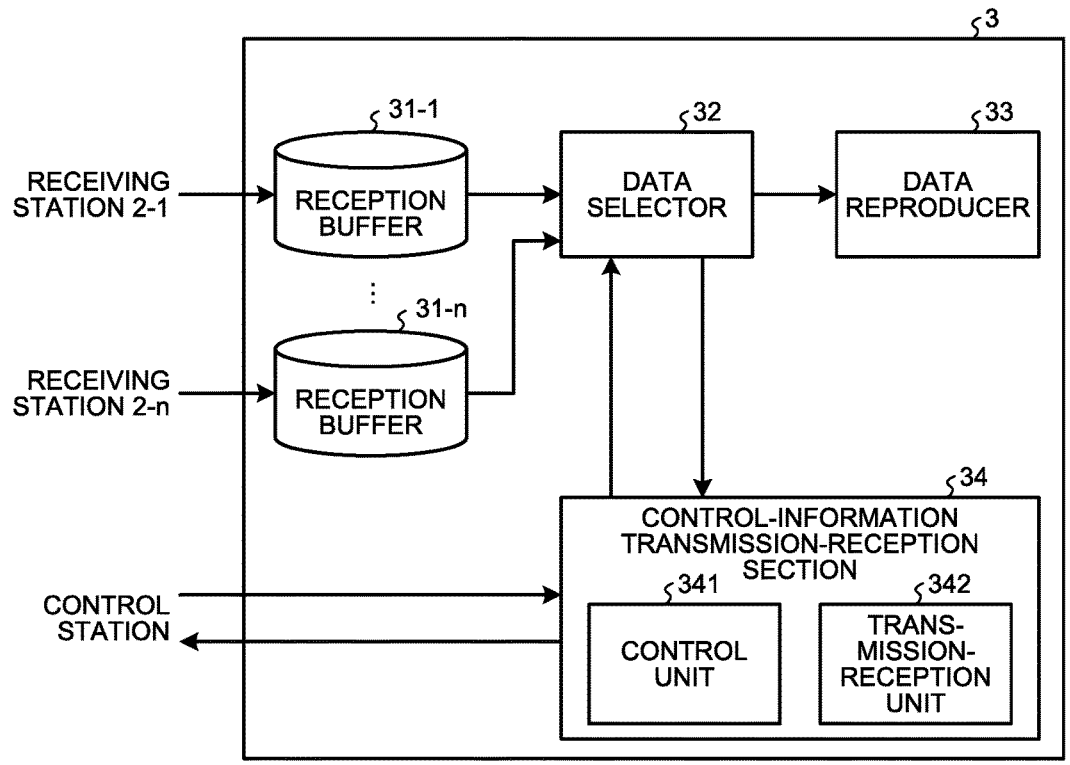
FIG. 7 is a diagram illustrating a configuration example of a central station in the embodiment.

FIG. 7 is a diagram illustrating a configuration example of the central station 3 in the present embodiment. The central station 3 in the present embodiment includes reception buffers 31-1 to 31-n, a data selector 32, a data reproducer 33, and a control-information transmission-reception section 34. The reference character "n" is an integer greater than or equal to two. The reception buffers 31-1 to 31-n store the decoded data and the reception results output from the receiving stations 2-1 to 2-n, respectively. The data selector 32 manages duplication or missing of the data received from the receiving stations 2-1 to 2-n to output continuous received data to the data reproducer 33.

The data reproducer 33 reproduces the data output from the data selector 32 as application data such as images. The control-information transmission-reception section 34 transmits and receives the control information to and from the control station 4, and controls the operation of the data selector 32. A transmission-reception unit 342 of the control-information transmission-reception section 34 receives the control information from the control station 4 and inputs the received control information to a control unit 341, and transmits control information generated by the control unit 341 to the control station 4. The control unit 341 grasps reception-target receiving stations 2 that are to be reception targets, on the basis of the control information input from the transmission-reception unit 342, and notifies the data selector 32 of the receiving stations 2 that are to be the reception targets. When the missing of data is detected by the data selector 32, the control unit 341 generates control information containing information indicating the missing data, and outputs the generated control information to the transmitter-receiver 342.

The parts illustrated in FIG. 7 can each be implemented as hardware such as an individual device or circuit. The reception buffers 31-1 to 31-n are memories, the data selector 32, the data reproducer 33, and the control unit 341 are processing circuits, and the transmission-reception unit 342 is a transmitter and a receiver. The above respective parts may be configured as individual circuits or devices, or a plurality of functional parts may be configured as a single circuit or device.

The data selector 32, the data reproducer 33, and the control unit 341 may be dedicated hardware, or may be a control circuit including a memory and a CPU that executes programs stored in the memory. When the data selector 32, the data reproducer 33, and the control unit 341 are implemented as the dedicated hardware, these are, for example, a single circuit, a combined circuit, a programmed processor, a parallel-programmed processor, an ASIC, an FPGA, or a combination thereof.

When the data selector 32, the data reproducer 33, and the control unit 341 are implemented by a control circuit including a CPU, the control circuit is, for example, the control circuit 200 of the configuration illustrated in FIG. 3. When the data selector 32, the data reproducer 33, and the control unit 341 are implemented by the control circuit 200 illustrated in FIG. 3, they are implemented by the processor 202 reading and executing the program stored in the memory 203 and corresponding to individual processing of each part.

Next, the operation of the central station 3 will be described. The reception buffers 31-1 to 31-n of the central station 3 store the decoded data and the reception results output from the receiving stations 2-1 to 2-n. The data selector 32 reads the decoded data held in the reception buffers 31-1 to 31-n, manages duplication and missing of the decoded data, and selectively reads the decoded data stored in the reception buffers 31-1 to 31-n to thereby provide a continuous data string. Here, it is assumed, for example, that data generated by the data generation unit 11 of the transmitting station 1 is framed, and the data generation unit 11 adds a sequence number to each frame. Further, it is assumed that the encoding unit 13 encodes data frame by frame, including a sequence number. In this case, decoded data is generated frame by frame, and each decoded piece of data contains a sequence number. In such a case, pieces of the decoded data stored in the reception buffers 31-1 to 31-n are arranged by the data selector 32 in the correct order on the basis of the sequence numbers. When the pieces of decoded data are duplicates, that is, when there is a plurality of pieces of decoded data of the same sequence number, all the pieces of decoded data can be recognized as the same data if it has been determined from the reception results that all of the pieces of the decoded data are correctly decoded. Thus, any one of the pieces of data can be selected by a desired method. In this case, on the basis of the receiving stations 2 that are to be the reception targets notified by the control unit 341, the data selector 32 may select data from the decoded data stored in the reception buffers 31-1 to 31-n corresponding to the receiving stations 2 that are the reception targets.

If the data selector 32 discards the decoded data that has not been received correctly using the above-described reception results, the data selector 32 does not use the decoded data of an incorrect sequence number, and thus can prevent its malfunctions. Further, the data selector 32 may perform the sorting of data in addition to the selection of data. For example, even when reversal of a data order occurs due to a router existing between each receiving station 2 and the central station 3, the data selector 32 performs the sorting of data in accordance with sequence numbers, thereby generating a continuous data string.

When the data selector 32 detects the missing of data, it may notify the control unit 341 of the missing sequence number, and the control unit 341 may generate control information containing information indicating the missing sequence number and notify the generated control information to the control station 4 through the transmission-reception unit 342. In this case, the control station 4 can instruct the transmitting station 1 to retransmit the missing data. This can achieve highly reliable transmission. Further, if the control unit 341 includes in control information, identification information on a receiving station 2 that is a source of decoded data corresponding to a missing sequence number, the control station 4 can detect reception failure for each receiving station 2. Thus, when the control station 4 is notified of the reception failure at a receiving station 2 a threshold number of times or more, the control station 4 can determine that the receiving station 2 is in an abnormal state, and remove this receiving station from reception target candidates.

When the decoding unit 24 of the receiving stations 2 output soft-decision values as decoded data, the data selector 32 can weight duplicate signals received from two receiving stations 2, by reliability information, and then perform vector synthesis, data determination, and decoding. For example, for signals received from two receiving stations, the two signals are weighted by a ratio in received signal quality and synthesized, so that the synthesized signal can have increased signal components of good received signal quality, that is, of high data reliability. In this case, as compared to the case where pieces of data from a plurality of receiving stations are synthesized by selecting one of pieces of data that are duplicates as described above, the reliability of received signals can be increased, and thus an error rate after decoding can be reduced.

The data reproducer 33 reproduces a continuous data string output from the data selector 32, into application data such as images.

Figure 8:
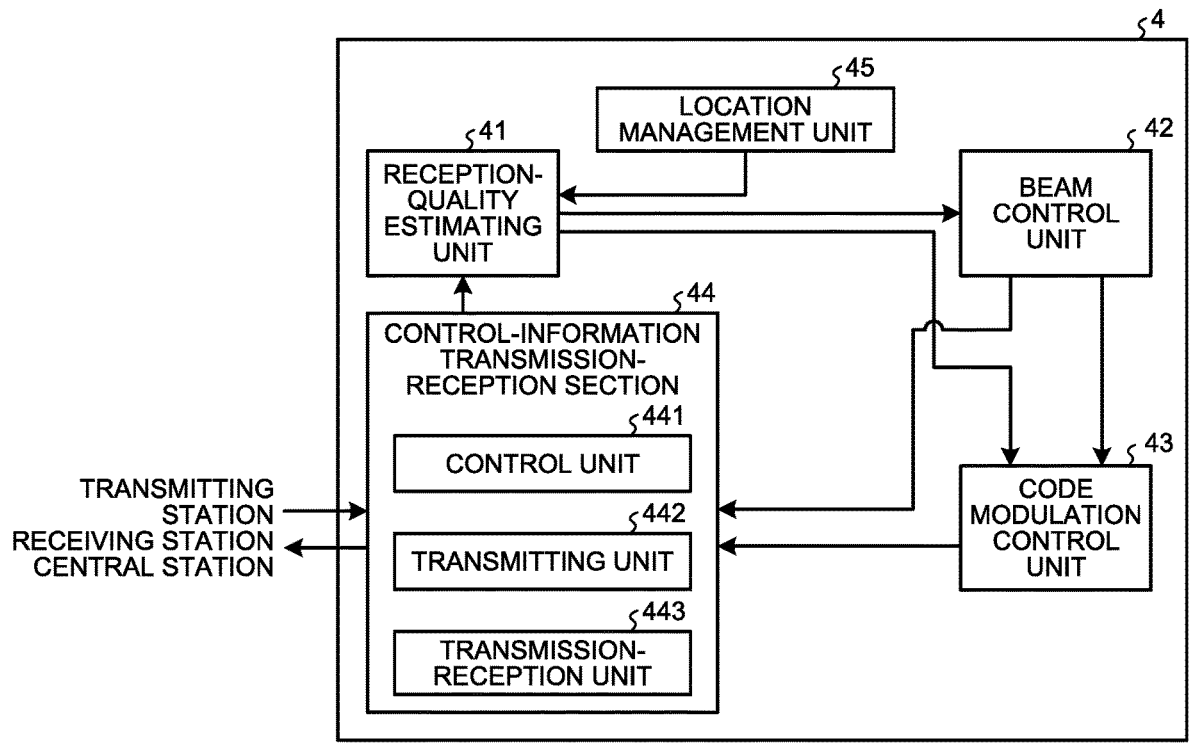
FIG. 8 is a diagram illustrating a configuration example of a control station in the embodiment.

FIG. 8 is a diagram illustrating a configuration example of the control station 4 in the present embodiment. The control station 4 in the present embodiment includes a reception-quality estimating unit 41, a beam control unit 42, a code modulation control unit 43, a control-information transmission-reception section 44, and a location management unit 45.

A reception-quality estimating unit 41 estimates a reception quality at the time when the receiving station 2 receives a signal transmitted by the transmitting station 1 and a reception quality at the time when the receiving station 8 receives a signal transmitted by the transmitting station 1. That is, the reception-quality estimating unit 41 calculates a reception-quality estimate value that is an estimated value of a received signal quality in the receiving station 2, which receives the signal transmitted from the transmitting antenna 16 of the transmitting station 1 and an interference amount that is an interference amount estimated value in the receiving station 8, that is, an estimated value of an interference amount. On the basis of the reception quality and the interference amount estimated by the reception-quality estimating unit 41, the beam control unit 42 selects the beam irradiation direction of the transmitting station 1, the receiving station 2 to be a station which receives signals transmitted from the transmitting station 1, and the orientation direction of the beam of the receiving station 2. That is, the beam control unit 42 determines the orientation direction of the transmitting antenna 16 of the transmitting station 1 and an orientation direction of a receiving antenna 21 of the receiving station 2 on the basis of the reception-quality estimate value and the interference amount.

A code modulation control unit 43 is a determiner that determines an encoding scheme and a modulation scheme to be used in communication between the transmitting station 1 and the receiving stations 2. A control-information transmission-reception section 44 transmits and receives control information to and from the transmitting station 1, the receiving stations 2, and the central station 3. A transmitting unit 442 of the control-information transmission-reception section 44 transmits the control information as radio signals to the transmitting station 1. A location management unit 45 calculates the location of the satellite in which the transmitting station 1 is mounted. The location management unit 45 may employ any method in calculating the location of the satellite, and, for example, calculates the position of the satellite by orbit determination or orbit propagation calculation.

A transmission-reception unit 443 of the control-information transmission-reception section 44 transmits and receives the control information to and from the receiving stations 2 and to and from the central station 3. The control unit 441 generates the control information containing the irradiation direction of the beam selected by the beam control unit 42 and an encoding scheme and a modulation scheme selected by the code modulation control unit 43, and outputs the generated control information to the transmitting unit 442. The control unit 441 also generates the control information to notify the receiving stations 2 of an encoding scheme and a modulation scheme selected by the code modulation control unit 43, and outputs the generated control information to the transmission-reception unit 443. Alternatively, the control unit 441 generates the control information to notify the receiving stations 2 of a decoding scheme and a demodulation scheme corresponding to the encoding scheme and the modulation scheme selected by the code modulation control unit 43, and outputs the generated control information to the transmission-reception unit 443.

Herein described is an example where the control station 4 notifies the transmitting station 1 of the encoding scheme and the modulation scheme, and notifies the receiving stations 2 of the decoding scheme and the demodulation scheme, but this is not limiting. As described above, the control station 4 may change the encoding scheme and the modulation scheme in a predetermined change pattern, and the receiving stations 2 may change the decoding scheme and the demodulation scheme in a predetermined change pattern. When the control unit 441 of the control-information transmission-reception section 44 receives the control information containing the information indicating missing data from the central station 3 through the transmission-reception unit 443, the control unit 441 generates control information for an instruction to retransmit the missing data and outputs the generated control information to the transmitting unit 442.

The control unit 441 may generate control information containing information indicating receiving stations 2 that are to be target stations that receive signals transmitted by the transmitting station 1, and notify the central station 3 of the generated control information through the transmission-reception unit 443. When the receiving stations 2 measure and transmit the received signal quality as the control information, the control unit 441 notifies the reception-quality estimating unit 41 of the received signal quality contained in the control information received through the transmission-reception unit 443. Then, the reception-quality estimating unit 41 may correct the estimate values of the received signal quality, on the basis of the notified received signal quality. For example, when the difference between the notified received signal quality and the estimate value of the received signal quality is greater than or equal to a predetermined threshold, the average value of these two is set as a corrected received signal quality estimate value, which is close to an actual propagation path condition.

The parts illustrated in FIG. 8 can each be implemented as hardware such as an individual device or circuit. The reception-quality estimating unit 41, the beam control unit 42, the code modulation control unit 43, the location management unit 45, and the control unit 441 are processing circuits, the transmission-reception unit 443 is a transmitter and a receiver, and the transmitting unit 442 is a radio transmitter. The above respective parts may be configured as individual circuits or devices, or a plurality of functional parts may be configured as a single circuit or device.

The reception-quality estimating unit 41, the beam control unit 42, the code modulation control unit 43, the location management unit 45, and the control unit 441 may be dedicated hardware, or may be a control circuit including a memory and a CPU that executes programs stored in the memory. When the reception-quality estimating unit 41, the beam control unit 42, the code modulation control unit 43, the location management unit 45, and the control unit 441 are implemented as the dedicated hardware, these are, for example, a single circuit, a combined circuit, a programmed processor, a parallel-programmed processor, an ASIC, an FPGA, or a combination thereof.

When the reception-quality estimating unit 41, the beam control unit 42, the code modulation control unit 43, the location management unit 45, and the control unit 441 are implemented by a control circuit including a CPU, the control circuit is, for example, the control circuit 200 of the configuration illustrated in FIG. 3. When the reception-quality estimating unit 41, the beam control unit 42, the code modulation control unit 43, the location management unit 45, and the control unit 441 are implemented by the control circuit 200 illustrated in FIG. 3, they are implemented by the processor 202 reading and executing the program stored in the memory 203 and corresponding to individual processing of each part.

Site diversity in the data transmission system in the present embodiment will be described hereinbelow. The site diversity in the data transmission system in the present embodiment is a method for reducing the probability of occurrence of rain attenuation by using a plurality of receiving stations, as described in Non Patent Literature 1 described above. It is assumed that when the availability rate provided in performing the site diversity by using two receiving stations 2 is 90%, the availability rate at each receiving station 2 is 80%, for example. The availability rate indicates an hour rate at which the amount of rain attenuation is smaller than a threshold at the receiving station 2. For example, when the site diversity is performed using the two receiving stations 2 one of which is in rain and provides the amount of rain attenuation larger than or equal to the threshold, the effect of rain attenuation can be avoided by using data received at the other receiving station 2 if the other receiving station 2 is under the clear sky. Thus, the availability rate provided when the site diversity is performed is higher than the availability rate provided when a single receiving station is used.

Figure 9:
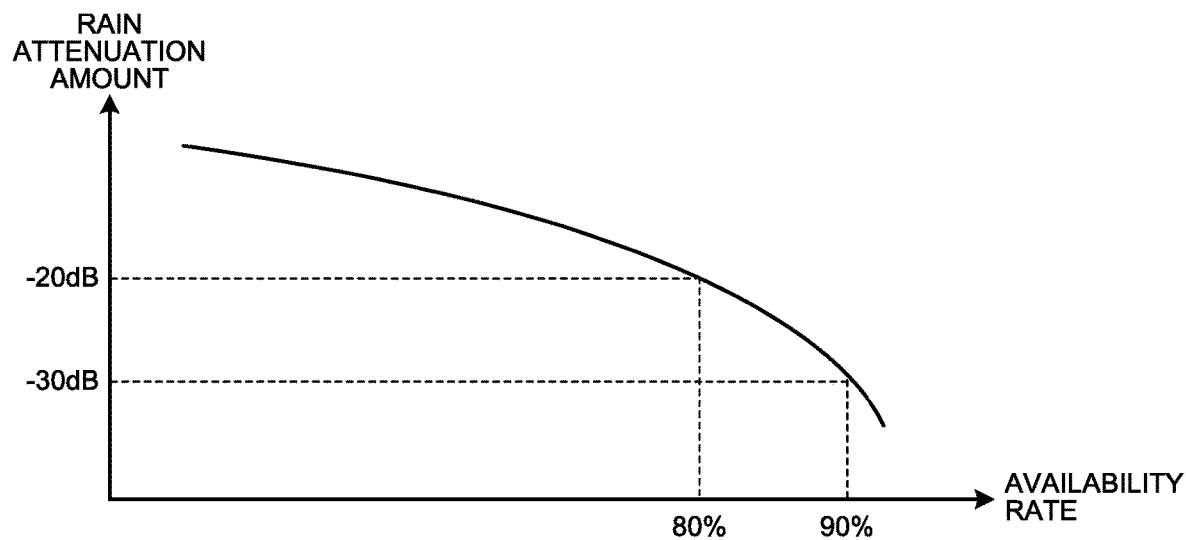
FIG. 9 is a graph schematically representing the relationship between an availability rate and a rain attenuation amount.

FIG. 9 is a graph schematically representing the relationship between the availability rate and the amount of rain attenuation. Numerical values in the figure show an example, and the actual availability rate and the actual amount of rain attenuation are not limited to the numerical values in the figure. According to FIG. 9, the amount of rain attenuation to be estimated in channel design at an availability rate of 80% is −20 dB. On the other hand, according to FIG. 9, the amount of rain attenuation to be estimated in channel design at an availability rate of 90% is −30 dB. That is, when the site diversity is performed, the amount of rain attenuation to be estimated can be reduced by 10 dB, as compared to the case where a single receiving station receives signals. This increases an estimate value of reception quality. Typically, the higher the estimate value of reception quality is, the higher the modulation level and the code rate can be set. Thus, when the site diversity is performed, the modulation level and the code rate can be set higher than when a single receiving station receives signals, thus improving the throughput.

On the other hand, when the frequency band for data transmission rises, the beam pattern of a beam formed by a transmitting antenna with the same antenna diameter becomes narrow in range. Thus, it is required to control the orientation direction of the beam such that the beam is emitted to a plurality of receiving stations performing site diversity. When the orbit of the satellite in which the transmitting station 1 is mounted is not a stationary orbit, the ground position of the sub-satellite point changes. In particular, when the transmitting station 1 is mounted in a polar orbiting satellite such as one in a synchronous sub-recurrent orbit, the latitude and longitude of the sub-satellite point greatly change, and the elevation angle of the satellite as viewed from the ground stations greatly changes.

Figure 10:
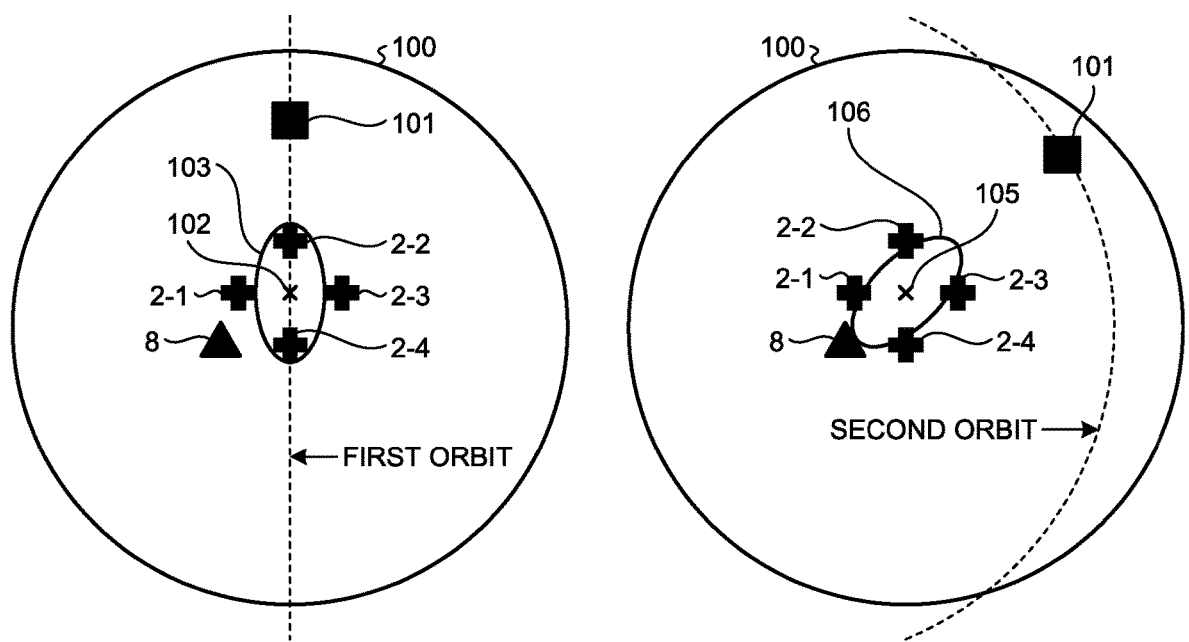
FIG. 10 is a diagram illustrating an example of a change in a footprint of a beam of the transmitting station mounted in a polar orbiting satellite.

FIG. 10 is a diagram illustrating an example of a change in the footprint of a beam of the transmitting station 1 mounted in a polar orbiting satellite such as one in a synchronous sub-recurrent orbit. The left side in FIG. 10 illustrates a center 102 of a beam and a footprint 103, the beam being formed by the transmitting antenna 16 when a satellite 101 in which the transmitting station 1 is mounted passes along a first orbit. In the example illustrated in FIG. 10, four receiving stations 2-1 to 2-4 installed on the Earth 100 are illustrated. The right side in FIG. 10 illustrates a center 105 of a beam and a footprint 106, the beam being formed by the transmitting antenna 16 when the satellite 101 in which the transmitting station 1 is mounted passes along a second orbit. The first orbit and the second orbit show orbits at different times when the same satellite circles in a synchronous sub-recurrent orbit or the like.

Referring to FIG. 10, even when the orientation direction of the beam from the transmitting antenna 16 of the transmitting station 1 as illustrated on the right side of FIG. 10 is once set such that the beam is emitted to the receiving stations 2-2 and 2-4 for performing the site diversity, the two receiving stations for performing the site diversity can fail to be appropriately irradiated with the beam, as illustrated on the left side of FIG. 10, due to changes in the latitude and longitude of the sub-satellite point and a change in the elevation angle of the satellite as viewed from the ground stations described above. In a case where the receiving station 8 of the second radio communication system using the same frequency as the first radio communication system is positioned within a range of the beam emitted by the transmitting station 1, the interference amount to the receiving station 8 may be increased.

To address that problem, in the present embodiment, the control station 4 calculates the received signal quality at the receiving station 2 and the interference amount (the evaluated value of the interference amount) at the receiving station 8, and calculates an evaluation value on the basis of the interference amount, such that the control station 4 selects the receiving station 2 to be a station that receives signals, selects the beam irradiation direction, and selects the antenna orientation direction of the receiving station 2. As a result, the received signal quality at the plurality of the receiving stations for performing the site diversity can be maintained at a desired value or more, thus improving throughput. Furthermore, the interference amount relative to the receiving station 8 can be maintained at equal to or less than a desired value, and deterioration in throughput of the other radio communication systems can be prevented.

Next, an operation of the control station 4 in the present embodiment will be described. A discussion is made hereinbelow as to an example where the control station 4 determines a beam irradiation direction, that is, a beam orientation direction of the transmitting station 1, a combination of the receiving stations 2 that receive radio signals transmitted from the transmitting station 1 and perform the site diversity, a modulation scheme, an encoding scheme, the antenna orientation direction of the receiving station 2, etc.

Figure 11:
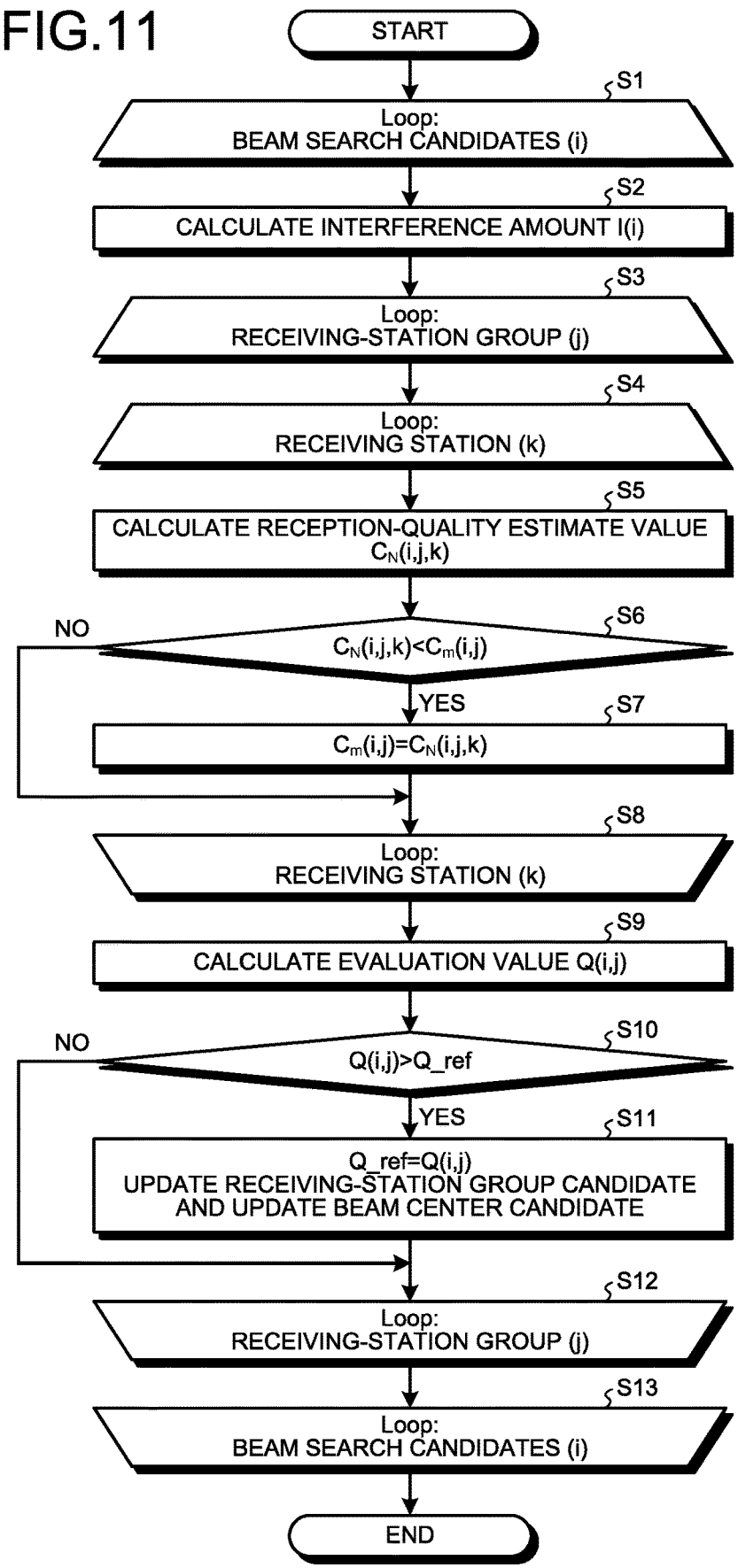
FIG. 11 is a flowchart illustrating an example of a beam determination processing procedure at a beam control unit.

FIG. 11 is a flowchart illustrating an example of a beam determination processing procedure at the beam control unit 42. As illustrated in FIG. 11, first, the beam control unit 42 starts a loop for all beam search candidates (step S1). In this loop, when the reference character "i" is a variable used for identifying a beam search candidate, i=1, 2, ..., $N_i$ is a condition of the loop. In the loop for the beam search candidate, the variable i is set to 1, 2, ..., $N_i$, in turn, and processing terminating at step S13 is repeatedly performed for each i. $N_i$ is the total number of beam search candidates, and can be set to a desired value. Here, the beam search candidate is defined as a point of the center of the beam of the transmitting antenna 16 of the transmitting station 1, the point being projected onto the ground surface and expressed by, for example, the latitude and the longitude. A point of the center of the beam of the transmitting antenna 16 of the transmitting station 1, which point is projected onto the ground surface and expressed by the latitude and the longitude, is hereinafter referred to as a beam center coordinate. Each beam center coordinate candidate is associated with i. For example, when the range for searching the beam center coordinate is set to 10 degree in each of the latitude and the longitude and the beam center coordinate candidates are set in increments of 0.1 degree, the number of beam center coordinate candidates amounts to ten thousand. In this case, the total number of the beam search candidates, that is, the total number $N_i$ of the beam center coordinate candidates is 10000, and the condition of the loop started in step S1 is i=1, 2, ..., 10000.

When the variable i is set in the loop for the beam search candidate, that is, the beam center coordinate candidate of the transmitting antenna is determined, the beam control unit 42 calculates an interference amount I(i) relative to the receiving station 8 in a case where the beam is emitted around the beam center coordinate defining the center (step S2). Here, the interference amount may be the number of receiving stations 8 at which interference power is less than an allowable value, or may be a ratio of the number of receiving stations 8 at which the interference power is less than the allowable value, to the total number of receiving stations 8. In any case, the interference amount I(i) is an index that has less effect on the receiving station 8 as I(i) increases. Furthermore, the allowable value of the interference power may be a combination of a threshold of the interference power and a threshold of time. For example, in a case where the interference power continuously exceeds a threshold of x watts for a threshold of y hours, the interference power may be determined to exceed the allowable value. Note that, the interference power can be calculated on the basis of the location of the transmitting station 1, transmission power of the transmitting station 1, the antenna orientation direction of the transmitting station 1, a beam pattern of the transmitting station 1, the location of the receiving station 8, the antenna orientation direction of the receiving station 8, and a beam pattern of the receiving station 8. For example, in a case where the antenna orientation direction of the transmitting station 1 and the antenna orientation direction of the receiving station 8 substantially face to each other, the interference power increases. It is assumed that the location management unit 45 of the control station 4 identifies the position of, the antenna orientation direction of, and the beam pattern of the receiving station 8. Specifically, the interference power can be calculated by a method of calculating the reception-quality estimate value of the transmitting station 1, as will be described later, without considering the rain attenuation amount and using a parameter regarding the receiving station 8 instead of a parameter regarding the receiving station 2.

Next, the beam control unit 42 starts a loop for receiving station groups (step S2). In this loop, where j is a variable used for identifying a receiving-station group, j=1, 2, ..., Nj is a condition of the loop. Nj is the total number of the receiving-station groups. Here, the receiving-station group means a group of receiving stations 2 that receive the same data from the transmitting station 1 at the same time. For example, the receiving-station group is a group of receiving stations 2 that receive the same data from the transmitting station 1 at the same time for the site diversity. In the present embodiment, described is an example of determining the group of receiving stations 2 that receive the same data from the transmitting station 1 at the same time for the site diversity. However, the purpose of using the group of receiving stations 2 that receive the same data from the transmitting station 1 at the same time is not limited to the site diversity. The correspondence between "j" that is a variable representing a receiving-station group, and the receiving stations 2 is predetermined and held in internal or external memory of the beam control unit 42 using a table or the like. The numbers of receiving-station groups and the identification information on the receiving stations 2 are associated in such a manner that, for example, the first (j=1) receiving-station group corresponds to the receiving station 2-1 and the receiving station 2-2, and the second (j=2) receiving-station group corresponds to the receiving station 2-1 and the receiving station 2-3.

The maximum value Nj of j can be expressed by the following formula (1) where n is the number of the receiving stations 2, and C represents a combination. In the following formula (1), when the desired reception quality can be ensured by a single receiving station 2, the single receiving station 2 may constitute the receiving-station group. When the number of the receiving stations constituting the receiving-station group is set to two or more, the last term on the right side of the following formula (1) should be deleted. When the upper limit of the number of the receiving stations 2 constituting the receiving-station group is specified, the upper limit value of the number of the receiving stations 2 can be used as the number of the receiving stations 2 in the following formula (1) in place of "n".

$$Nj = {}_nC_n + {}_nC_{n-1} + \ldots {}_nC_1 \qquad (1)$$

Next, the beam control unit 42 starts a loop for the receiving stations 2 (step S4). In this loop, where k is a variable used for identifying the receiving station 2, k=1, 2, ..., Nk is a condition of the loop. Nk is the total number of the receiving stations 2 in the receiving-station group. The reference character "k" is assigned in descending order of numbers in such a manner that, for example, the receiving station 2 with the lowest identification information in the receiving-station group is set to k=1, and one with the second lowest identification information is set to k=2. For example, when j=1 and the first receiving-station group is formed of the receiving station 2-1 and the receiving station 2-2, and the pieces of identification information on the receiving station 2-1 and the receiving station 2-2 are "2-1" and "2-2", respectively, the receiving station 2-1 corresponds to k=1, and the receiving station 2-2 corresponds to k=2. When j=2 and the second receiving-station group is formed of the receiving station 2-1 and the receiving station 2-3, and the pieces of identification information on the receiving station 2-1 and the receiving station 2-3 are "2-1" and "2-3", respectively, the receiving station 2-1 corresponds to k=1, and the receiving station 2-3 corresponds to k=2.

Next, the beam control unit 42 indicates i, j, and k to the reception-quality estimating unit 41, and instructs the reception-quality estimating unit 41 to calculate a reception-quality estimate value CN(i, j, k) (step S5). The reception-quality estimating unit 41 calculates the reception-quality estimate value CN(i, j, k), and notifies the reception-quality estimate value CN(i, j, k) to the beam control unit 42. CN(i, j, k) represents the reception-quality estimate value at the kth receiving station 2 in the jth receiving-station group when the ith beam search candidate is selected and the jth receiving-station group is selected. A method of calculating the reception-quality estimate value will be described later.

Next, the beam control unit 42 determines whether CN(i, j, k) is smaller than Cm(i, j) or not (step S6). Cm(i, j) is a value that is a minimum reception-quality estimate value when the ith beam search candidate is selected and the jth receiving-station group is selected. The initial value of Cm(i, j) is set at a value larger than an expected minimum reception-quality estimate value. For example, the initial value of Cm(i, j) is set to a value larger than the average value of expected reception-quality estimate values. When CN(i, j, k) is smaller than Cm(i, j) (Yes in step S6), the beam control unit 42 sets Cm(i, j)=CN(i, j, k) (step S7), and proceeds to step S8. When CN(i, j, k) is not smaller than Cm(i, j) (No in step S6), the beam control unit 42 proceeds to step S8.

In step S8, in a case where the loop of the receiving station is not terminated, that is, $k=N_k$ is not satisfied, the beam control unit 42 returns to step S3, and when the loop of the receiving station is terminated, the procedure proceeds to step S9.

In step S9, the beam control unit 42 calculates an evaluation value Q(i, j) by using the interference amount and the reception-quality estimate value (step S9). Specifically, the beam control unit 42 may perform calculation defined as $Q(i,j)=\alpha \times (I(i)) + \beta \times C_m(i,j)$ by using weighting coefficients $\alpha$ and $\beta$. In this case, setting a to 1 and $\beta$ to zero achieves an effect of minimizing the interference. Similarly, setting a to zero and $\beta$ to 1 provides an effect of maximizing the reception-quality estimate value. The weighting coefficients $\alpha$ and $\beta$ can be determined in advance based on, for example, a communication quality required for the receiving station 8 of the second communication system and a communication quality required for the receiving station 2. Furthermore, the weighting coefficients $\alpha$ and $\beta$ may be changed.

Next, the beam control unit 42 determines whether the evaluation value Q(i, j) is larger than Q_ref (step S10). The value Q_ref indicates the maximum value of the evaluation value in the combination of the beam and the receiving station calculated so far, and an initial value of Q_ref is set to a value smaller than a possible maximum evaluation value. In a case where Q(i, j) is larger than Q_ref (Yes in step S10), the beam control unit 42 sets that Q_ref=Q(i, j) (step S11) and proceeds to step S12. In a case where Q(i, j) is not larger than Q_ref (No in step S10), the procedure proceeds to step S12.

In step S12, in a case where the loop of the receiving-station group is not terminated, that is, $j=N_j$ is not satisfied, the beam control unit 42 returns to step S3, and in a case where the loop of the receiving-station group is terminated, the procedure proceeds to step S13. In step S13, in a case where the loop for the beam search candidate is not terminated, that is, $i=N_i$ is not satisfied, the beam control unit 42 returns to step S1, and in a case where the loop for the beam search candidate is terminated, the processing is completed.

According to the above processing, when the processing is completed, the receiving-station group and the beam center candidate that maximizes the evaluation value are selected.

Figure 12:
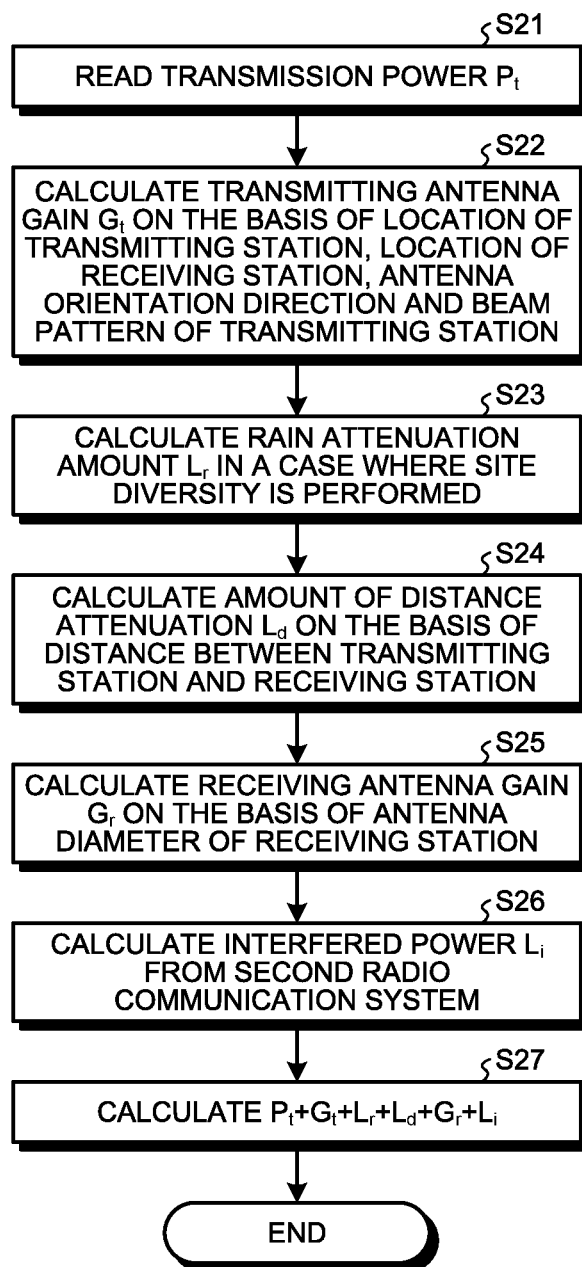
FIG. 12 is a flowchart illustrating an example of a processing procedure of calculating a reception-quality estimate value.

Next, the calculation of the reception-quality estimate value in step S5 will be described. FIG. 12 is a flowchart illustrating an example of a processing procedure of calculating the reception-quality estimate value in the present embodiment. FIG. 12 is an example, and the procedure of calculating the reception quality estimate value is not limited to the example in FIG. 12. As illustrated in FIG. 12, the reception-quality estimating unit 41 reads a transmission power Pt of the transmitting station 1 previously stored in the internal or external memory of the reception-quality estimating unit 41 (step S21). The transmitting station 1 may be configured such that the transmission power Pt can be changed.

Figure 13:
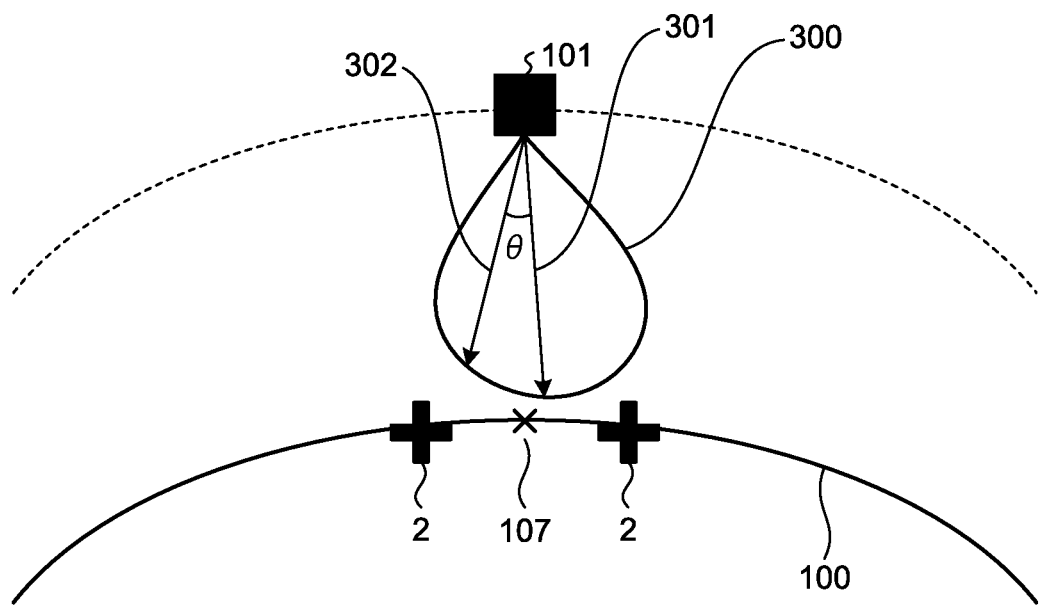
FIG. 13 is a diagram for explaining an angle θ between a beam center and a vector directed from the transmitting station toward the receiving station.

Next, the reception-quality estimating unit 41 calculates a transmitting antenna gain $G_t$ of the transmitting station 1, on the basis of the location of the transmitting station 1, the location of the receiving station 2, an antenna orientation direction of the transmitting station 1 corresponding to the ith beam search candidate, and a beam pattern of the transmitting station 1 (step S22). Specifically, for example, the reception-quality estimating unit 41 calculates the transmitting antenna gain $G_t$ as follows. Here, the beam pattern represents the transmitting antenna gain according to an angle from the center of the beam. The beam pattern is previously held in an internal or external memory of the beam control unit 42. The reception-quality estimating unit 41 acquires the location of the transmitting station 1 from the location management unit 45. The location of the receiving station 2 is previously stored in the internal or external memory of the reception-quality estimating unit 41. Then, the reception-quality estimating unit 41 calculates an angle θ between a beam center 301 and a vector 302 directed from the transmitting station 1 toward the receiving station 2 when the orientation direction of the transmitting antenna 16 is set such that the direction from the location of the transmitting station 1 to the beam center coordinates corresponding to the beam search candidate is the beam center. FIG. 13 is a diagram for explaining the angle θ between the beam center and the vector directed from the transmitting station 1 mounted on the satellite 101 toward the receiving station 2. In FIG. 13, a beam center coordinate 107 is a coordinate of the beam center corresponding to the beam search candidate. FIG. 13 schematically describes a beam pattern 300 centering the transmitting station 1. It is noted that the beam pattern 300 does not represent an emitted beam itself. The reception-quality estimating unit 41 calculates the transmitting antenna gain $G_t$ corresponding to "0", using the beam pattern.

Next, the reception-quality estimating unit 41 calculates the amount of rain attenuation Lr when the receiving station 2 belonging to the jth receiving-station group performs the site diversity (step S23). Here, the amount of rain attenuation is calculated on the assumption that the receiving station 2 belonging to the jth receiving-station group performs the site diversity. The reception-quality estimating unit 41 calculates the amount of rain attenuation, for example, the amount of rain attenuation Lr provided when the site diversity is performed. As described in, for example, Non Patent Literature 1, the reception-quality estimating unit 41 calculates a joint rain attenuation amount estimate value when the site diversity is performed, from a target availability rate and the probability that all the receiving stations 2 performing the site diversity have a desired amount of rain attenuation or more simultaneously. Then, the amount of rain attenuation at the single receiving station corresponding to the joint rain attenuation amount estimate value is designated at reference character Lr. That is, "Lr" can be defined as the amount of rain attenuation at the single receiving station corresponding to the joint rain attenuation amount estimate value that is calculated from the target availability rate and the probability that one or more receiving stations simultaneously receiving the data transmitted from the transmitting station 1 simultaneously have the desired amount of rain attenuation or more. When the site diversity is not applied, it is only necessary to calculate the amount of rain attenuation at the single receiving station 2.

Next, the reception-quality estimating unit 41 calculates the amount of distance attenuation Ld on the basis of the distance between the transmitting station 1 and the receiving station 2 (step S24). The distance between the transmitting station 1 and the receiving station 2 can be calculated on the basis of the location of the transmitting station 1 and the location of the receiving station 2 described above. For example, the reception-quality estimating unit 41 determines the amount of distance attenuation Ld as a free space propagation loss. However, when there is an obstacle on a straight line between the transmitting station 1 and the receiving station 2, for example, when the receiving station 2 is disposed on a mountain or the like, a loss due to the obstacle is taken into consideration.

Next, the reception-quality estimating unit 41 calculates the receiving antenna gain $G_r$ on the basis of an antenna diameter of the receiving station 2 (step S25). It is assumed that the antenna diameters of the individual receiving stations 2 be stored in the internal or external memory of the reception-quality estimating unit 41. Unlike the transmitting antenna gain described above, the receiving antenna 21 is controlled so as to be continuously oriented toward the transmitting station; thus, the receiving antenna 21 has less effect of the reduction in the gain caused by an angle difference than the transmitting antenna 16. Therefore, it is preferable that the angle between the direction of the transmitting station 1 and the antenna center be set to a predetermined fixed value including a design error and the like.

Next, the reception-quality estimating unit 41 calculates interfered power $L_i$ (step S26). The interfered power $L_i$ is a value indicating deterioration in the reception quality caused by the interference by the signal transmitted from the transmitting station 7 at the receiving station 2 and corresponds to a reciprocal of the power from the transmitting station 7 received by the receiving station 2. The interfered power $L_i$ can be calculated on the basis of the location of the transmitting station 7, the transmission power of the transmitting station 7, the antenna orientation direction of the transmitting station 7, the beam pattern of the transmitting station 7, the location of the receiving station 2, the antenna orientation direction of the receiving station 2, and the beam pattern of the receiving station 2. When the plurality of transmitting stations 7 is provided, the reception-quality estimating unit 41 calculates a total sum of the interference powers from all the transmitting stations 7 as the interfered power $L_i$.

Figure 14:
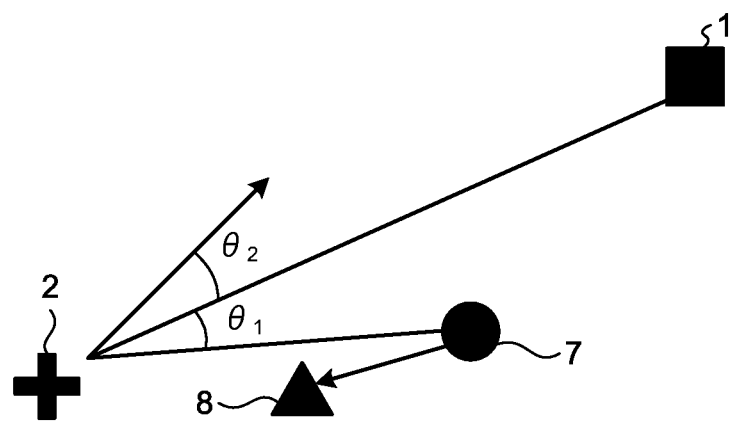
FIG. 14 is a diagram for explaining an antenna orientation direction of the receiving station.

The antenna orientation direction of the receiving station 2 is determined so that the interference power from the transmitting station 7 decreases, that is, so that the reception-quality estimate value increases. FIG. 14 is a diagram for explaining the antenna orientation direction of the receiving station 2. In FIG. 14, it is assumed that the receiving antenna 21 of the receiving station 2 be oriented toward the transmitting station 1. In a case where the receiving antenna 21 of the receiving station 2 is oriented toward the transmitting station 1 as illustrated in FIG. 14, a beam angle to the transmitting station 7 at the receiving station 2, that is, an angle between the orientation center of the receiving station 2 and the direction of the transmitting station 7 is $\theta_1$. Whereas, when the receiving antenna 21 of the receiving station 2 is inclined by $\theta_2$ in the direction away from the transmitting station 7, the interference power from the transmitting station 7 can be reduced. For example, the reception-quality estimating unit 41 calculates the interference power from the transmitting station 7 by increasing the angle θ2 of the inclination of the receiving antenna 21 of the receiving station 2 in increments of a certain amount, such that the reception-quality estimating unit 41 determines the antenna orientation direction of the receiving station 2 by using the angle $\theta_2$ at which the interference power from the transmitting station 7 is equal to or less than the threshold. The control unit 261 of the receiving station 2 controls the receiving antenna 21 on the basis of the antenna orientation direction received from the control station 4.

Next, the reception-quality estimating unit 41 calculates $P_t+G_t+L_r+L_d+G_r+L_i$, defines the calculated value as the reception-quality estimate value (step S27), and completes the processing. In the above processing, the reception-quality estimating unit 41 calculates the reception-quality estimate value on the basis of all of: the transmission power of the transmitting station 1; the transmitting antenna gain of the transmitting station 1; the receiving antenna gain of the receiving station 2; the rain attenuation amount at the receiving station 2; and the distance attenuation at the receiving station. However, the reception-quality estimate value may be calculated on the basis of at least one of these values. Here, it is assumed that $P_t$, $G_t$, $L_r$, $L_d$, $G_r$, and $L_i$ described above are calculated in decibels.

Figure 15:
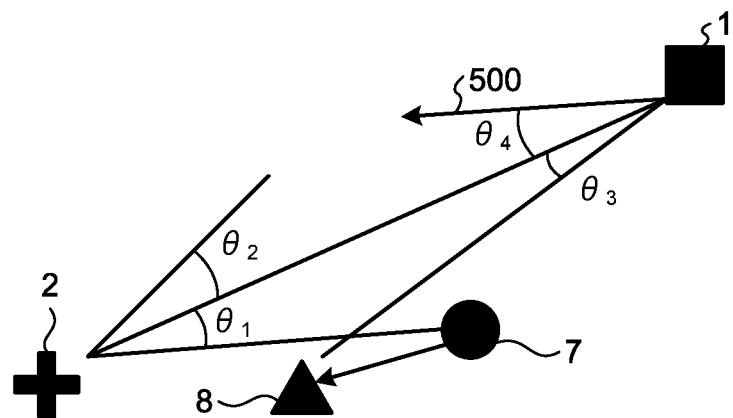
FIG. 15 is a diagram illustrating an example of a beam irradiation direction of the transmitting station determined by the processing explained with reference to FIGS. 11 and 12.

FIG. 15 is a diagram illustrating an example of the beam irradiation direction of the transmitting station 1 determined by the processing explained with reference to FIGS. 11 and 12. In the example of FIG. 15, the orientation method of the receiving antenna 21 at the receiving station 2 is similar to the orientation method in the example illustrated in FIG. 14. In the example illustrated in FIG. 15, the receiving antenna of the receiving station 2 is further inclined by $\theta_2$ from $\theta_1$. In FIG. 15, in a case where the transmitting antenna 16 of the transmitting station 1 is oriented toward the receiving station 2, that is, where the beam irradiation direction is the direction to the receiving station 2, an angle between the receiving station 8 and the beam irradiation direction of the transmitting antenna 16 of the transmitting station 1 as viewed from the transmitting station 1 is $\theta_3$. Since the single receiving station 2 is provided in FIG. 15, the received signal quality at the receiving station 2 is generally the highest when the transmitting antenna 16 of the transmitting station 1 is oriented toward the receiving station 2. On the other hand, when the processing explained with reference to FIGS. 11 and 12 is performed with α>0, the interference amount relative to the receiving station 8 is considered. Therefore, the beam irradiation direction of the transmitting station 1 is a direction 500. When the beam irradiation direction of the transmitting station 1 is the direction 500, an angle between the receiving station 8 and the beam irradiation direction of the transmitting antenna 16 of the transmitting station 1 as viewed from the transmitting station 1 is increased by $\theta_4$ as compared with the angle between the receiving station 8 and the beam irradiation direction that is the direction to the receiving station 2. Therefore, the interference to the receiving station 8 is reduced. Although FIG. 15 illustrates the example in which the single receiving station 2 is provided, an example in which a plurality of receiving stations 2 is provided achieves the similar result to the example of FIG. 15. Namely, the interference to the receiving station 8 can be reduced as compared with the interference provided when a is equal to zero (α=0), that is, when only the received signal qualities of the plurality of receiving stations 2 are considered.

Note that the processing described above is performed based on the assumption that the first radio communication system 401 and the second radio communication system 402 illustrated in FIG. 1 use the same frequency or the same polarization. However, in a case where the first radio communication system 401 can use a frequency or polarization different from that of the second radio communication system 402, selection processing for selecting at least one of the frequency and the polarization may be added to the processing described above.

Figure 16:
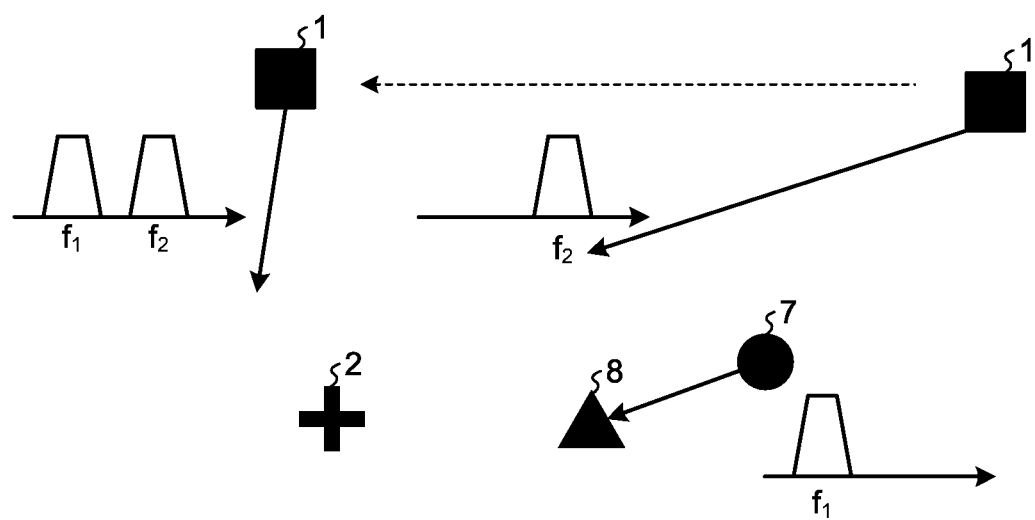
FIG. 16 is a diagram illustrating an example of selection of a frequency.

FIG. 16 is a diagram illustrating an example of the selection of the frequency. It is assumed that a radio transmitting unit 15 of the transmitting station 1 can perform communication using a frequency $f_1$ and a frequency $f_2$. In the example illustrated in FIG. 16, on the basis of the frequency used by the second radio communication system 402, the beam control unit 42 of the control station 4 selects the frequency to be used by the transmitting station 1. As a result, the radio transmitting unit 15 transmits data with the frequency determined on the basis of the frequency used by the other radio communication system. Specifically, the beam control unit 42 of the control station 4 selects the frequency used by the transmitting station 1, in accordance with the frequency used by the other radio communication system and whether an angle between the direction viewed from the transmitting station 1 to the receiving station 2 and the direction viewed from the transmitting station 1 to the receiving station 8 is equal to or less than the threshold. In the example illustrated in FIG. 16, it is assumed that the second radio communication system 402 perform communication by using the frequency $f_1$. For the transmitting station 1 illustrated on the right side of FIG. 16, the angle between the direction viewed from the transmitting station 1 to the receiving station 2 and the direction viewed from the transmitting station 1 to the receiving station 8 is equal to or less than the threshold, and the beam control unit 42 of the control station 4 selects the frequency $f_2$ different from the frequency of the second radio communication system 402, as the frequency used by the transmitting station 1. For the transmitting station 1 illustrated on the left side of FIG. 16, both the frequency $f_1$ and the frequency $f_2$ are selected as the frequency used by the transmitting station 1.

Instead of determining whether the angle between the direction viewed from the transmitting station 1 to the receiving station 2 and the direction viewed from the transmitting station 1 to the receiving station 8 is equal to or less than the threshold, a loop of a frequency is additionally set outside the processing illustrated in FIG. 11. In this loop, three cases are set, i.e., a case where both the frequency $f_1$ and the frequency $f_2$ are used, a case where the frequency $f_1$ is used, and a case where the frequency $f_2$ is used. As a result, a combination having the highest evaluation value can be selected from among combinations including setting of the frequency. In this case, both the frequency $f_1$ and the frequency $f_2$ should be selected when the received signal quality is equal to or higher than a certain value.

Figure 17:
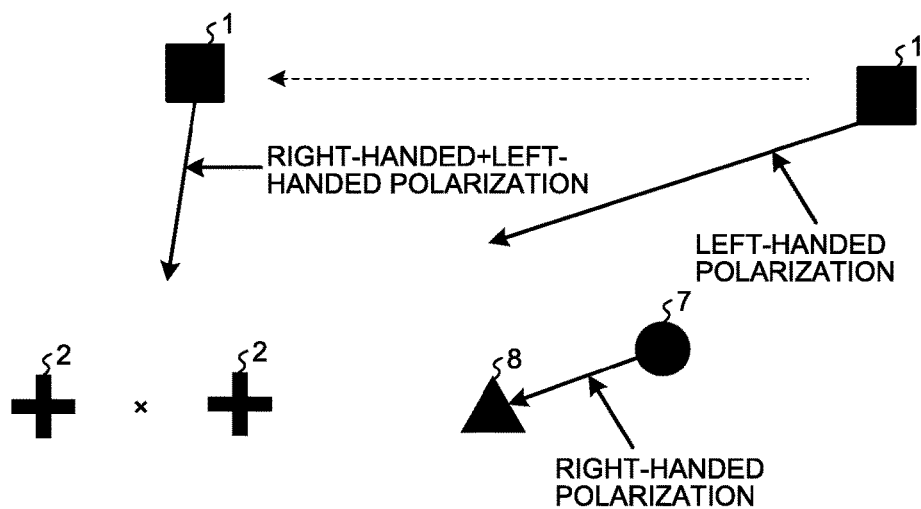
FIG. 17 is a diagram illustrating an example of selection of polarization.

FIG. 17 is a diagram illustrating an example of selection of the polarization. It is assumed that the radio transmitting unit 15 of the transmitting station 1 can perform communication by using right-handed polarization and left-handed polarization. In the example illustrated in FIG. 17, the beam control unit 42 of the control station 4 selects the polarization used by the transmitting station 1 on the basis of the polarization used by the second radio communication system 402. As a result, the radio transmitting unit 15 transmits data with the polarization determined on the basis of the polarization used by the other radio communication system. In the example illustrated in FIG. 17, similarly to the case of the frequency illustrated in FIG. 16, the beam control unit 42 of the control station 4 selects the polarization used by the transmitting station 1 in accordance with whether the angle between the direction viewed from the transmitting station 1 to the receiving station 2 and the direction viewed from the transmitting station 1 to the receiving station 8 is equal to or less than the threshold. In the example illustrated in FIG. 17, it is assumed that the second radio communication system 402 perform communication by using the right-handed polarization. For the transmitting station 1 illustrated on the right side of FIG. 17, the angle between the direction viewed from the transmitting station 1 to the receiving station 2 and the direction viewed from the transmitting station 1 to the receiving station 8 is equal to or less than the threshold. The beam control unit 42 of the control station 4 selects the left-handed polarization different from the polarization used by the second radio communication system 402, as the polarization used by the transmitting station 1. For the transmitting station 1 illustrated on the left side of FIG. 17, both the left-handed polarization and the right-handed polarization are selected as the polarization used by the transmitting station 1. In this case, similar to the example of the frequency, instead of determining whether the angle between the direction viewed from the transmitting station 1 to the receiving station 2 and the direction viewed from the transmitting station 1 to the receiving station 8 is equal to or less than the threshold, a loop of the polarization may be additionally set outside the processing illustrated in FIG. 11 and three cases may be set in this loop, i.e., a case where both the left-handed polarization and the right-handed polarization are used, a case where the left-handed polarization is used, and a case where the right-handed polarization is used.

Furthermore, in a case where the transmitting antenna 16 of the transmitting station 1 and the receiving antenna 21 of the receiving station 2 are antennas having an asymmetric beam pattern such as an elliptical antenna, the loop of the beam pattern may be set outside the processing illustrated in FIG. 11 in addition to the antenna orientation direction and the beam control unit 42 of the control station 4 may select the beam pattern.

Figure 18:
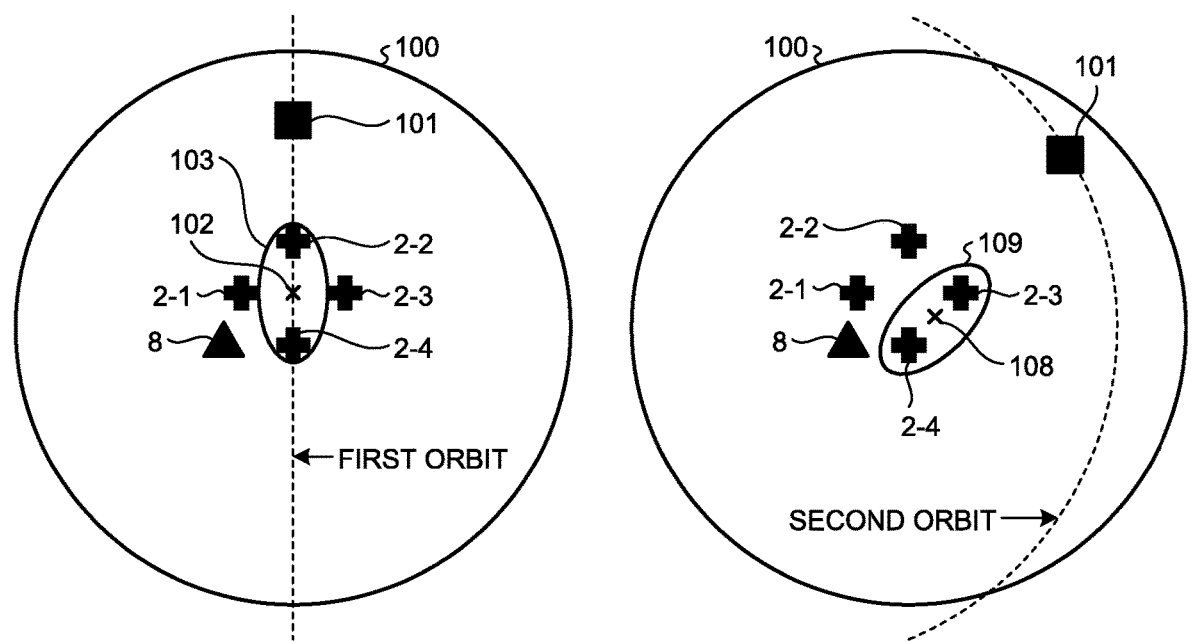
FIG. 18 is a diagram illustrating an example of a footprint of a beam when a receiving-station group and a beam center candidate are selected in the embodiment.

When the receiving-station group and the beam center candidate are selected by the above-described method, the high received signal quality can be ensured even when the location of the satellite changes. FIG. 18 is a diagram illustrating an example of the footprint of a beam when the selection of the receiving-station group and the beam center candidate in the first embodiment is performed. A first orbit and a second orbit in FIG. 18 are identical to those in the example illustrated in FIG. 10. The left side in FIG. 18 illustrates the same state as that on the left side in FIG. 10. The right side in FIG. 18 illustrates an example where the satellite 101 in which the transmitting station 1 is mounted moves in the second orbit. In FIG. 18, a beam center 108 is located between the receiving station 2-3 and the receiving station 2-4, and a footprint 109 covers the receiving station 2-3 and the receiving station 2-4. Thus, in the present embodiment, the receiving stations 2 and a beam irradiation direction can be selected in correspondence to the location of the satellite, so that the high reception-quality estimate values can be maintained even when the location of the satellite changes.

When the demodulation unit 23 of the receiving station 2 measures the reception quality as described above, the control station 4 may receive the reception quality from the receiving station 2 to correct the reception-quality estimate value calculated by the above-described processing, using the received reception quality.

The beam control unit 42 determines the orientation direction of the receiving antenna 21 of each of the receiving stations 2 belonging to the selected receiving-station group candidate. The beam control unit 42 notifies the control unit 441 of the determined orientation direction of the receiving antenna 21 of the receiving station 2, together with identification information on the receiving station 2. The control unit 441 stores in the control information the orientation direction of the receiving antenna 21 received from the beam control unit 42 and instructs the transmission-reception unit 443 to transmit the control information to the receiving station 2 that is the destination. Furthermore, on the basis of the result of the selection of the beam and the receiving-station group, the beam control unit 42 calculates the beam irradiation direction corresponding to the selected beam center candidate and notifies the control unit 441 of the beam irradiation direction. The control unit 441 generates the control information containing the beam irradiation direction, and instructs the transmitting unit 442 to transmit the control information to the transmitting station 1. On the basis of the result of the selection of the beam and the receiving-station group, the beam control unit 42 instructs the control unit 441 to transmit to the receiving stations not belonging to the selected receiving-station group, the control information containing information indicating that these receiving stations are not the reception target stations. On the basis of the instruction, the control unit 441 generates the control information containing the information indicating that those receiving stations are not the reception target stations, and instructs the transmission-reception unit 443 to transmit the control information to the receiving stations not belonging to the selected receiving-station group. On the basis of the result of the selection of the beam and the receiving-group, the beam control unit 42 notifies the code modulation control unit 43 of the receiving stations 2 belonging to the selected receiving-station group candidate.

The code modulation control unit 43 reads from the memory of the reception-quality estimating unit 41 the reception-quality estimate values associated with the receiving stations 2 notified by the beam control unit 42. It is noted that the reception-quality estimating unit 41 temporarily holds all the reception-quality estimate values calculated in step S5 in the internal memory, and at the completion of the processing illustrated in FIG. 11, the reception-quality estimating unit 41 holds in the internal memory the reception-quality estimate value of each receiving station in the receiving-station group corresponding to the receiving-station group and the beam center candidate that are selected finally. On the basis of the read reception-quality estimate values, the code modulation control unit 43 determines the encoding scheme and the modulation scheme to satisfy a desired error rate. Specifically, since a low reception-quality estimate value leads to a high error rate, when the reception-quality estimate values are low, the code modulation control unit 43 selects the encoding scheme of a low code rate, and selects the modulation scheme of a low modulation level. For example, the reception-quality estimate values are divided into a plurality of stages, a combination of the encoding scheme and the modulation scheme satisfying the desired error rate is predetermined for each stage, and the encoding scheme and the modulation scheme at each stage are held as a table. On the basis of the table and the read reception-quality estimate value, the code modulation control unit 43 selects the encoding scheme and the modulation scheme.

The code modulation control unit 43 notifies the control-information transmission-reception section 44 of the encoding scheme and the modulation scheme. The control-information transmission-reception section 44 generates the control information containing the encoding scheme and the modulation scheme, and notifies the transmitting station 1 and the receiving stations 2 of the generated control information. The encoding scheme and the modulation scheme may be notified by a single piece of the control information, or may be notified as different pieces of the control information each containing the encoding scheme and the modulation scheme.

Where the beam pattern is variable when the reception-quality estimating unit 41 calculates the transmitting antenna gain Gt, the transmitting antenna gain Gt may be calculated for each of a plurality of beam pattern candidates. For example, an asymmetrical beam pattern such as an ellipse is included, the transmitting antenna gain Gt is calculated for the beam patterns when the antenna is rotated. For a configuration in which a phase and an amplitude are changed like a phased array antenna, the phase and amplitude candidates may be determined for calculation for the beam pattern at that time. In the processing in FIG. 11, a loop for the beam patterns is added. When the beam pattern is changed as described above, the control station 4 can notify the transmitting station 1 of the beam pattern in addition to the beam irradiation direction.

In the above description, the control station 4 determines the beam irradiation direction and the receiving-station group for each transmitting station, on the basis of the interference power and the reception-quality estimate value. However, the present invention is not limited to this, and the transmitting station 1 may determine the beam irradiation direction and the receiving-station group for each transmitting station, on the basis of the interference power and the reception-quality estimate value.

As described above, in the present embodiment, in the data transmission system in which the transmitting station 1 transmits data to the central station 3 via the receiving station 2, the control station 4 estimates the interference power to the other radio communication system, estimates the reception-quality estimate value in consideration of the interfered power from the other radio communication system, and determines the beam irradiation direction and the receiving-station group for each transmitting station, on the basis of the interference power and the reception-quality estimate value. Therefore, even in a case where different radio communication systems concurrently use the same frequency or the same polarization, the transmitting station can transmit data while suppressing the interference to the other radio communication system below a certain value.

The configurations illustrated in the above embodiments illustrate an example of the subject matter of the present invention, and can be combined with another known art, and can be partly omitted or changed without departing from the scope of the present invention.

REFERENCE SIGNS LIST 1, 7 transmitting station; 2, 2-1 to 2-4, 8 receiving station; 3 central station; 4 control station; 11, 51 data generation unit; 12 transmission buffer; 13 encoding unit; 14 modulation unit; 15 radio transmitting unit; 16 transmitting antenna; 17, 26 control-information receiving section; 21 receiving antenna; 22 radio receiving unit; 23 demodulation unit; 24 decoding unit; 25, 31-1 to 31-$n$ reception buffer; 32 data selector; 33 data reproducer; 34, 44 control-information transmission-reception section; 41 reception-quality estimating unit; beam control unit; 43 code modulation control unit; 171, 261, 441 control unit; 172, 262 receiving unit; 442 transmitting unit; 443 transmission-reception unit.

The invention claimed is:

1. A transmitting station, of a first radio communication system, comprising:
   a transmitting antenna, of the first radio communication system, capable of changing an orientation direction thereof;
   a controller, of the first radio communication system, to control the orientation direction of the transmitting antenna in accordance with the orientation direction of the transmitting antenna, the orientation direction of the transmitting antenna and a receiving station, of the first radio communication system, for receiving data transmitted from the transmitting antenna being determined on the basis of an estimated value of a received signal quality at a receiving station, of the first radio communication system, that is a candidate for receiving the data transmitted from the transmitting antenna and an estimated value of an interference amount caused by reception of the data in a second radio communication system, the second radio communication system using a same frequency or polarization as the first radio communication system; and
   a receiver to receive, from, a control station, information indicating the orientation direction of the transmitting antenna determined on the basis of the estimated value of the received signal quality and the estimated value of the interference amount calculated by the control station, wherein
   the controller controls the orientation direction of the transmitting antenna on the basis of the information received from the control station.

2. The transmitting station according to claim 1, further comprising:
   a radio transmitter to transmit the data at a frequency determined on the basis of a frequency used in the other radio communication system.

3. The transmitting station according to claim 1, further comprising:
   a radio transmitter to transmit the data with polarization determined on the basis of polarization used in the other radio communication system.

4. A control station of a first radio communication system comprising:
   a reception-quality estimator to calculate a reception-quality estimate value and an interference amount estimated value, the reception-quality estimate value being an estimated value of a received signal quality at a receiving station of the first radio communication system to be a candidate of a receiving station for receiving data transmitted from the transmitting antenna of the transmitting station according to claim 1, the interference amount estimated value being an estimated value of an interference amount caused by reception of the data in a second radio communication system, the second radio communication system using a same frequency or polarization as the first radio communication system;
   a beam controller to determine an orientation direction of the transmitting antenna and the receiving station that receives the data transmitted from the transmitting antenna, on the basis of the reception-quality estimate value and the interference amount estimated value; and
   a transmitter to transmit, to the transmitting station, the orientation direction of the transmitting antenna determined by the beam controller.

5. The control station according to claim 4, wherein
   the beam controller calculates an evaluation value and determines, on the basis of the evaluation value, the orientation direction of the transmitting antenna and the receiving station that receives the data, the evaluation value being a sum of a first value and a second value, the first value being obtained by multiplying the reception-quality estimate value by a weighting coefficient, the second value being obtained by multiplying the interference amount estimated value by a weighting coefficient.

6. The control station according to claim 4, wherein
   the beam controller selects a frequency used by the transmitting station, on the basis of a frequency used by the other radio communication system.

7. The control station according to claim 4, wherein
   the beam controller selects polarization used by the transmitting station, on the basis of polarization used by the other radio communication system.

8. A receiving station capable of receiving data from the transmitting station according to claim 1, the receiving station comprising:
   a receiving antenna capable of changing an orientation direction thereof;
   a controller to control the orientation direction of the receiving antenna on the basis of the orientation direction of the receiving antenna selected on the basis of an interference amount at the receiving station from another radio communication system; and
   a receiver to receive, from a control station, the orientation direction of the receiving antenna determined by the control station, wherein
   the controller controls the orientation direction of the receiving antenna on the basis of the orientation direction of the receiving antenna received from the control station.

9. A data transmission system of a first radio communication system comprising:
   a transmitting station;
   a control station; and a receiving station, wherein the transmitting station comprises:

a transmitting antenna capable of changing an orientation direction thereof;

a controller to control the orientation direction of the transmitting antenna in accordance with the orientation direction of the transmitting antenna, the orientation direction of the transmitting antenna and a receiving station for receiving data transmitted from the transmitting antenna being determined on the basis of an estimated value of a received signal quality at a receiving station of the first radio communication station that is a candidate for receiving the data transmitted from the transmitting antenna and an estimated value of an interference amount caused by reception of the data in a second radio communication system, the second radio communication system using a same frequency or polarization as the first radio communication system; and a receiver to receive, from a control station, information indicating the orientation direction of the transmitting antenna determined on the basis of the estimated value of the received signal quality and the estimated value of the interference amount calculated by the control station, wherein the controller of the transmitting station controls the orientation direction of the transmitting antenna on the basis of the information received from the control station, wherein the control station comprises:

a reception-quality estimator to calculate a reception-quality estimate value and an interference amount estimated value, the reception-quality estimate value being the estimated value of the received signal quality, the interference amount estimated value being the estimated value of the interference amount caused by reception of the data in the second radio communication system;

a beam controller to determine the orientation direction of the transmitting antenna and the receiving station that receives the data transmitted from the transmitting antenna, on the basis of the reception-quality estimate value and the interference amount estimated value; and a transmitter to transmit, to the transmitting station, the orientation direction of the transmitting antenna determined by the beam controller, wherein the receiving station comprises:

a receiving antenna capable of changing an orientation direction thereof;

a controller to control the orientation direction of the receiving antenna on the basis of the orientation direction of the receiving antenna selected on the basis of an interference amount at the receiving station from the second radio communication system; and a receiver to receive, from the control station, the orientation direction of the receiving antenna determined by the control station, wherein the controller of the receiving station controls the orientation direction of the receiving antenna on the basis of the orientation direction of the receiving antenna received from the control station.

10. A data transmission method of a data transmission system of a first radio communication system including a transmitting station including a transmitting antenna, a receiving station capable of receiving data transmitted from the transmitting antenna, and a control station, the method comprising:

calculating a reception-quality estimate value and an interference amount estimated value, the reception-quality estimate value being an estimated value of a received signal quality at a receiving station of the first radio communication system to be a candidate of the receiving station for receiving data transmitted from the transmitting antenna, the interference amount estimated value being an estimated value of an interference amount caused by the reception of the data in a second radio communication system, the second radio communication system using a same frequency or polarization as the first radio communication system;

determining an orientation direction of the transmitting antenna and the receiving station that receives the data transmitted from the transmitting antenna, on the basis of the reception-quality estimate value and the interference amount estimated value;

transmitting the determined orientation direction of the transmitting antenna to the transmitting station; and controlling the orientation direction of the transmitting antenna, on the basis of the orientation direction of the transmitting antenna received from the control station.

* * * * *